(12) United States Patent
Sugama et al.

(10) Patent No.: US 9,226,050 B2
(45) Date of Patent: *Dec. 29, 2015

(54) TRANSMISSION APPARATUS AND TRANSMISSION METHOD

(71) Applicant: FUJITSU LIMITED, Kawasaki-shi, Kanagawa (JP)

(72) Inventors: Koichi Sugama, Shimotsuga (JP); Masashige Kawarai, Saitama (JP); Hiroyuki Ishii, Oyama (JP); Yukio Katayanagi, Sano (JP); Kenichi Hasegawa, Kuki (JP); Takashi Kaiga, Utsunomiya (JP); Hiromitsu Yanaka, Shimotsuke (JP); Tomohiro Ueno, Oyama (JP)

(73) Assignee: FUJITSU LIMITED, Kawasaki (JP)

( * ) Notice: Subject to any disclaimer, the term of this patent is extended or adjusted under 35 U.S.C. 154(b) by 338 days.

This patent is subject to a terminal disclaimer.

(21) Appl. No.: 13/873,562

(22) Filed: Apr. 30, 2013

(65) Prior Publication Data

US 2013/0330075 A1 Dec. 12, 2013

(30) Foreign Application Priority Data

Jun. 11, 2012 (JP) .................................. 2012-131901

(51) Int. Cl.
*G02F 1/00* (2006.01)
*H04Q 11/00* (2006.01)
*H04J 3/08* (2006.01)
*H04J 3/06* (2006.01)

(52) U.S. Cl.
CPC ............ *H04Q 11/0062* (2013.01); *H04J 3/085* (2013.01); *H04J 3/0691* (2013.01)

(58) Field of Classification Search
CPC .... H04B 10/03; H04B 10/032; H04B 10/035; H04B 10/038; H04J 14/0287; H04Q 11/0001; H04Q 11/0003; H04Q 11/0005
USPC ............. 398/3, 5, 1, 2, 4, 7, 8, 10, 13, 17, 20, 398/79, 58, 45, 48, 49, 33, 38, 59, 154, 398/155; 370/216, 217, 218, 222, 223, 225, 370/228, 352, 389, 392, 254

See application file for complete search history.

(56) References Cited

U.S. PATENT DOCUMENTS 5,717,796 A * 2/1998 Clendening ...................... 385/24
6,222,653 B1 * 4/2001 Asahi ............................... 398/4

(Continued)

FOREIGN PATENT DOCUMENTS

JP         6-334621        12/1994
JP         10-285081       10/1998

(Continued)

OTHER PUBLICATIONS

Office Action issued Nov. 4, 2013 in U.S. Appl. No. 13/424,931.

(Continued)

*Primary Examiner* — Hanh Phan
(74) *Attorney, Agent, or Firm* — Staas & Halsey LLP

(57) ABSTRACT

A transmission apparatus includes a network-side interface unit configured to receive a signal transmission frame into which a client signal is arranged from each of a working line and a protection line of a network, and extract the client signal from the received signal transmission frame, a client-side interface unit configured to transmit the extracted client signal to a client transmission path by using a generated clock, based on frequency adjustment information of the client signal included in the signal transmission frame, a protection-line-side memory configured to store the frequency adjustment information of the client signal included in the signal transmission frame received from the protection line, and a switch controller configured to control to generate a clock by using the frequency adjustment information of the client signal stored in the protection-line-side memory when the signal transmission frame fails to be received from the working line.

12 Claims, 20 Drawing Sheets

(56) References Cited

U.S. PATENT DOCUMENTS

| | | | |
|---|---|---|---|
| 8,767,802 B2 * | 7/2014 | Nagaki et al. | 375/219 |
| 2009/0204843 A1 | 8/2009 | Celinski et al. | |
| 2010/0238936 A1 | 9/2010 | Matsui et al. | |

FOREIGN PATENT DOCUMENTS

| | | |
|---|---|---|
| JP | 2001-237694 | 8/2001 |
| JP | 2010-226200 | 10/2010 |

OTHER PUBLICATIONS

Notice of Allowance issued Feb. 20, 2014 in U.S. Appl. No. 13/424,931.

Japanese Office Action issued Oct. 21, 2014 in related Japanese patent application No. 2011-082227.

* cited by examiner

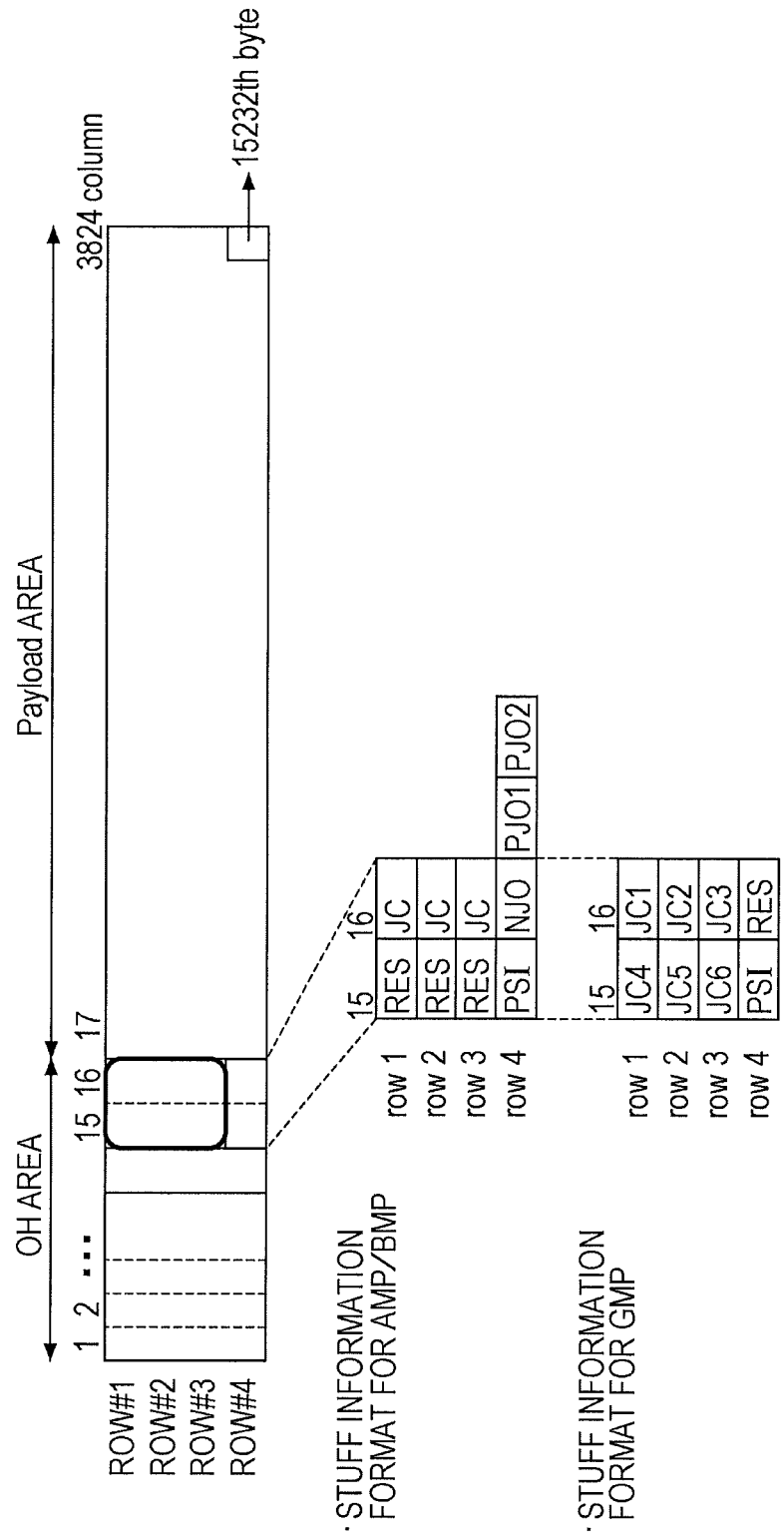

FIG. 15

| DA | SA | VLAN | TYPE | DATA | FCS |

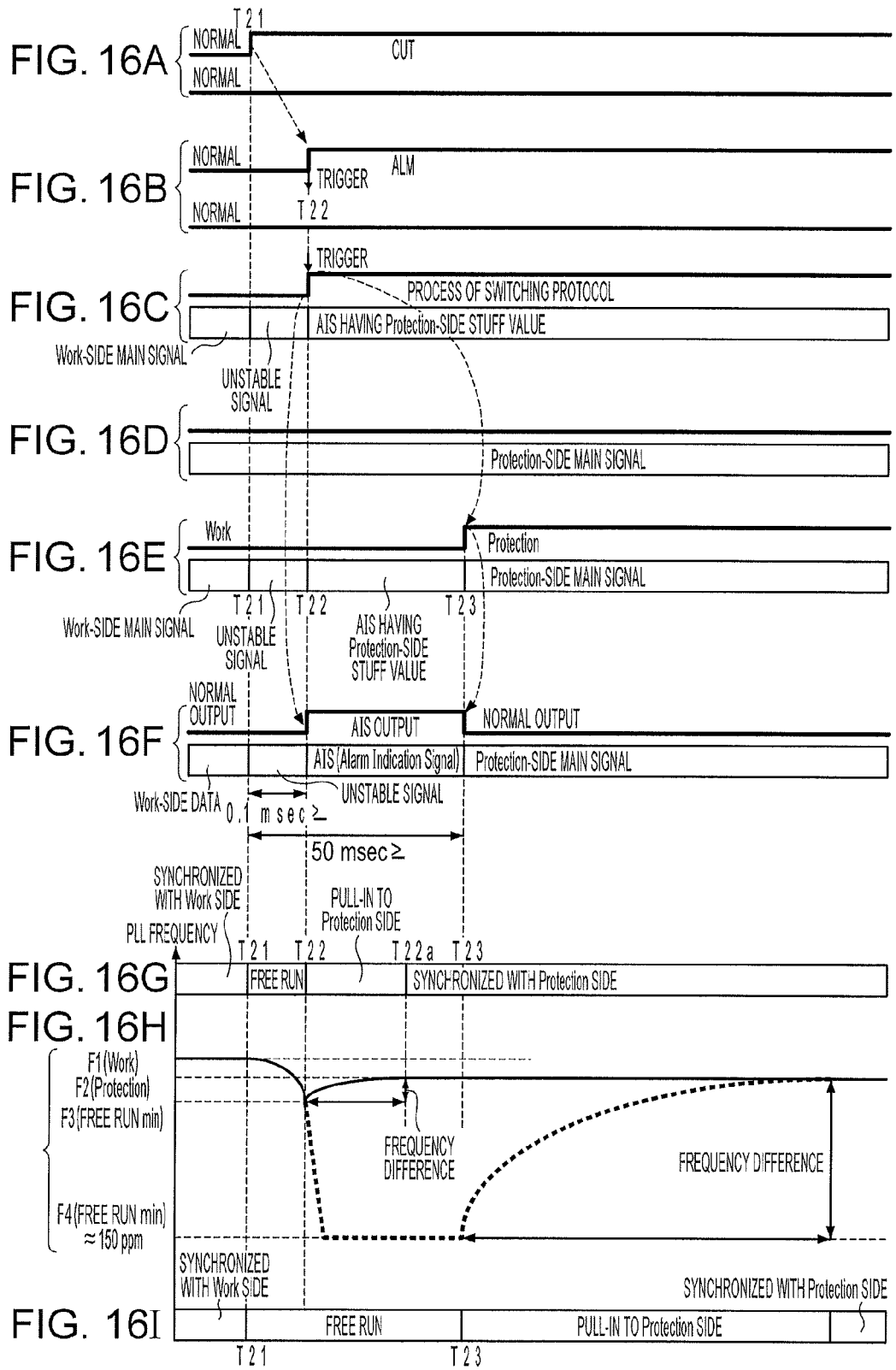

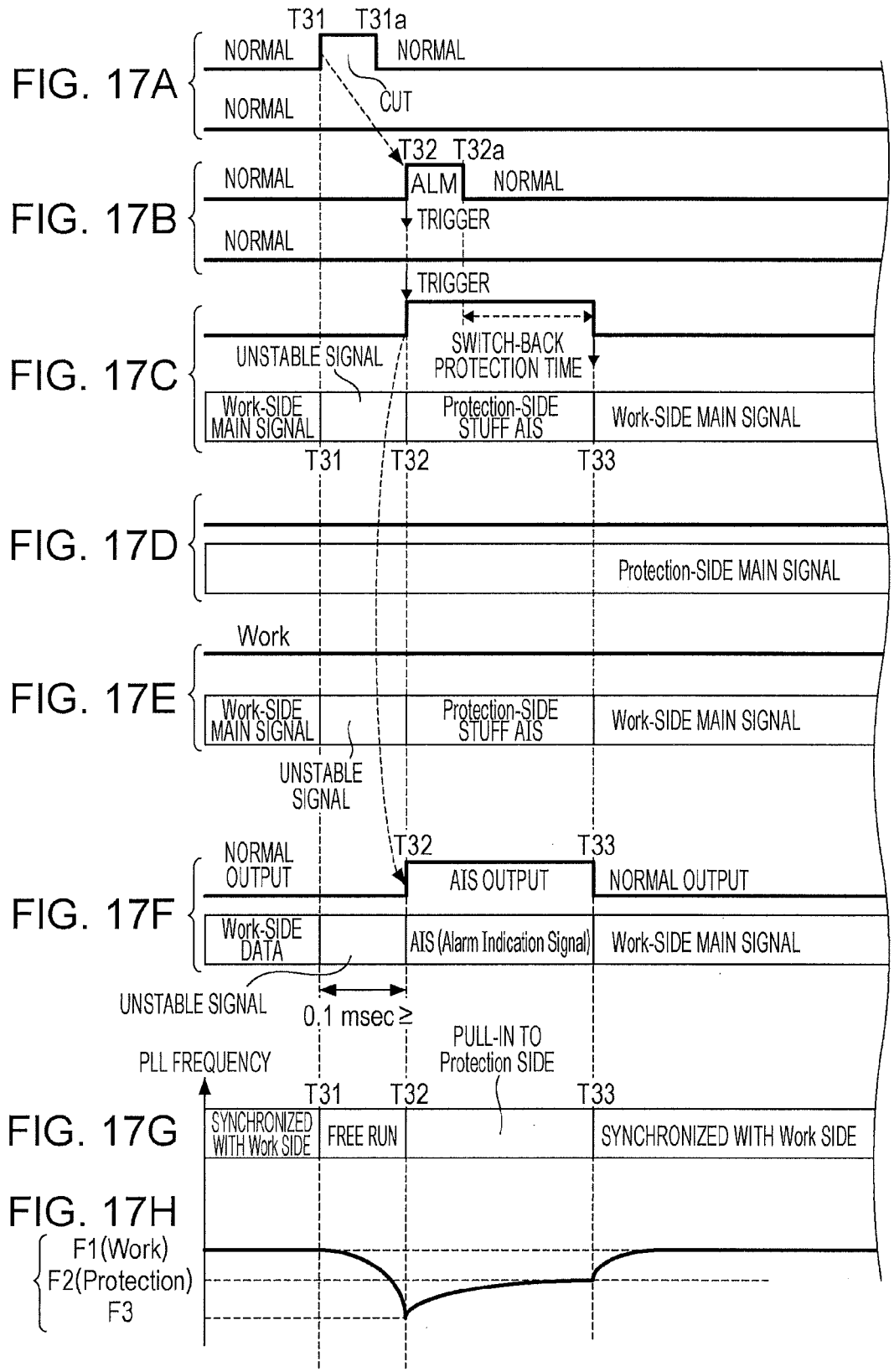

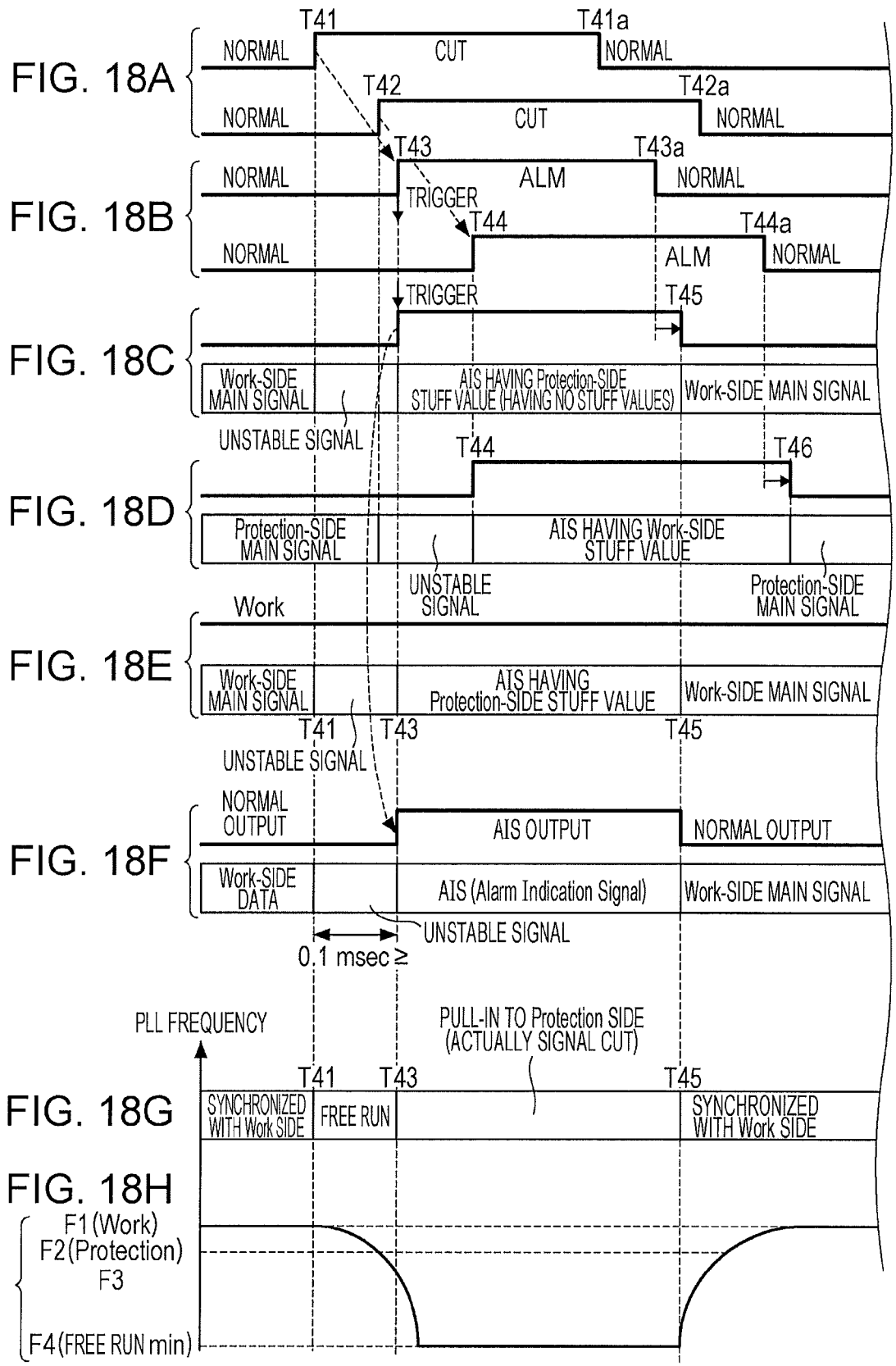

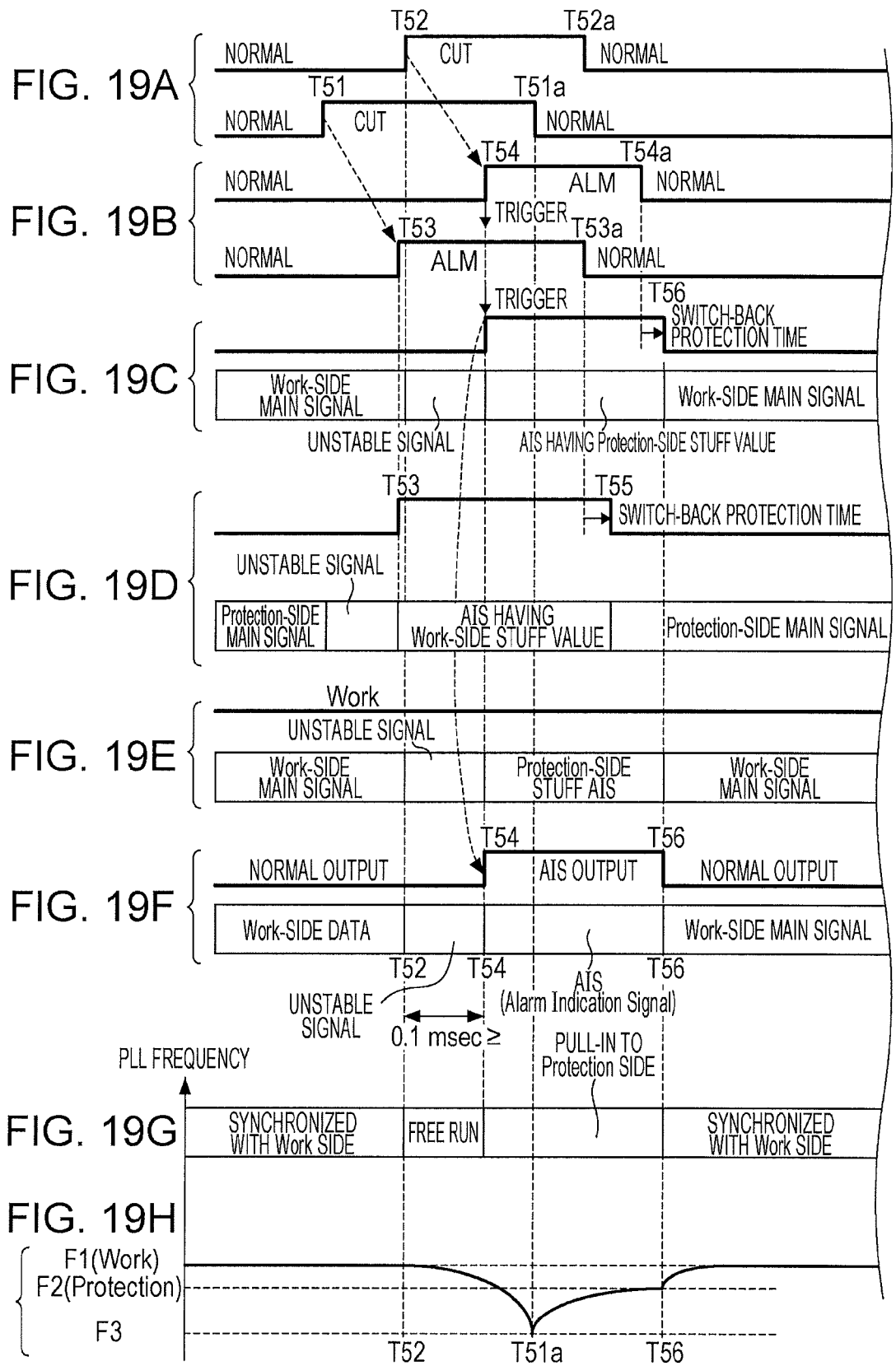

TRANSMISSION APPARATUS AND TRANSMISSION METHOD

CROSS-REFERENCE TO RELATED APPLICATION

This application is based upon and claims the benefit of priority of the prior Japanese Patent Application No. 2012-131901, filed on Jun. 11, 2012, the entire contents of which are incorporated herein by reference.

FIELD

The embodiment discussed herein is related to a transmission apparatus and a transmission method for separating a client signal from a signal transmission frame received from a network, and transmitting the separated client signal to a client transmission path.

BACKGROUND

Recently, based on the wavelength division multiplexing (WDM) scheme which is able to handle a rapid increase in Internet traffic, an optical transport network (OTN) has been recommended by the International Telecommunication Union-Telecommunication Standardization Sector (ITU-T) as a so-called transparent transmission platform in which an upper layer does not have to be aware of a lower layer when a client signal is transmitted from end to end not only in a synchronous network, such as a synchronous digital hierarchy (SDH) or a synchronous optical network (SONET), but also in an asynchronous network, such as a network based on the Internet Protocol (IP) or the Ethernet (registered trademark). The interface and the frame format of the OTN are standardized in ITU-T Recommendation G. 709, and have been rapidly introduced into commercial systems.

FIG. 1 is a configuration diagram illustrating an exemplary network of a SONET transmission system. As illustrated in FIG. 1, the transmission apparatuses 1A, 1B, 1C, and 1D form a ring network having a redundant configuration including a working line (Work) through which a signal is transmitted in the clockwise direction as indicated by a solid line, and a protection line (Protection) through which a signal is transmitted in the counterclockwise direction as indicated by a dotted line. The transmission apparatuses 1B, 1C, and 1D operate in synchronization with the master clock of the transmission apparatus 1A.

FIG. 2 is a configuration diagram illustrating an exemplary transmission apparatus in a SONET transmission system. In FIG. 2, a signal which is input from the client-side interface is terminated in a SONET-frame synchronizing circuit 2. The clock of the signal is then switched to the system clock generated by a clock generator 4 in a clock-switch stuff generating circuit 3. Then, the signal is mapped into a SONET frame in a SONET-frame generating circuit 5 and is output to a network via the network-side interface.

In the same manner, an input signal from the network-side interface is terminated in a SONET-frame synchronizing circuit 6. The clock of the input signal is then switched to the system clock generated by the clock generator 4 in a clock-switch circuit 7. Then, the signal is mapped into a client frame in a client-frame generating circuit 8 and is output to a client transmission path via the client-side interface.

The network-side interface has a redundant configuration including the working line (Work) and the protection line (Protection) which are used in such a manner that, when a failure occurs in the working line (Work), the data transmission line is switched from the working line to the protection line so as to restore the transmission of a signal.

In the SONET transmission system, a switching control time period in which a line-disconnection alarm is detected when a line disconnection occurs in the working line, and in which the line-disconnection alarm causes switching to be performed between the working line and the protection line is approximately 40 ms or less. This complies with the network system request that the switching time be 50 ms or less.

In the SONET transmission system, a synchronized clock is used in the entire network, and all of the signal processors in an apparatus operate by using the synchronized clock. In contrast, the OTN transmission system is applied to an upper layer of the SONET transmission system, and is regarded as being equivalent to a transmission path in the WDM system. Accordingly, a signal is desirably transmitted transparently from the client interface. The client interface desirably transmits client signals having various transmission rates for, for example, the Ethernet (registered trademark) and a fiber channel in addition to a SONET/SDH interface. Therefore, a client signal and a network signal are asynchronously processed. When a client signal is transmitted to the network signal side, the frequency components of the signal are also transmitted as information, and the receiver side reproduces the client interface signal from the received frequency components.

FIG. 3 is a configuration diagram illustrating an exemplary network of an OTN transmission system. As illustrated in FIG. 3, transmission apparatuses 11A, 11B, 11C, and 11D form a ring network having a redundant configuration including a working line (Work) through which a signal is transmitted in the clockwise direction as indicated by a solid line and a protection line (Protection) through which a signal is transmitted in the counterclockwise direction as indicated by a dotted line. The transmission apparatuses 11A, 11B, 11C, and 11D operate asynchronously.

FIG. 4 is a configuration diagram illustrating an exemplary transmission apparatus of an OTN transmission system. In FIG. 4, a client signal from a client transmission path is converted into an electric signal in an optical/electronic (O/E) converter 21, and the client clock is extracted in a client interface 22. Then, the client signal is supplied to an ODU-frame stuff generating circuit 23. The ODU-frame stuff generating circuit 23 maps the client signal into an ODUk frame. At that time point, justification control (JC) bytes which are stuff information serving as frequency adjustment information of the client signal are added to the overhead of the ODUk frame, and stuff bytes for absorbing the time-base change for the client signal are inserted into the payload area or the overhead area of the ODUk frame.

The ODUk frame that is output from the ODU-frame stuff generating circuit 23 is mapped into an internal frame in an internal-frame stuff generating circuit 24. The internal frame is transmitted through a cross connector and a multiplex separator (which are not illustrated) and is terminated in an internal-frame stuff terminating circuit 25 so as to be output as an ODUk frame. A clock generating circuit 26 generates the system clock and supplies the system clock to, for example, the ODU-frame stuff generating circuit 23, the internal-frame stuff generating circuit 24, and the internal-frame stuff terminating circuit 25.

An overhead and a forward error correction (FEC) are added to the ODUk frame in OTU-frame generating circuits 27A and 28B for the working line and the protection line, respectively, so as to form OTUk frames. The OTUk frames are converted into optical signals in electronic/optical (E/O) converters 28A and 28B, and are transmitted to the OTN network.

An OTU signal from the working line of the OTN network is converted into an electronic signal in an optical/electronic (O/E) converter 31A and is terminated in an OTU-frame synchronizing circuit 32A so as to be output as an ODUk frame and be supplied to a selector (SEL) 35. A clock generating circuit 33A generates a clock that is synchronized with the network clock extracted from the OTU signal, and supplies the generated clock, for example, to the OTU-frame synchronizing circuit 32A and an internal-frame stuff generating circuit 36 described below. Similarly, an OTU signal from the protection line of the OTN network is converted into an electronic signal in an optical/electronic (O/E) converter 31B and is terminated in an OTU-frame synchronizing circuit 32B so as to be output as an ODUk frame and be supplied to the selector (SEL) 35.

An ODUk frame selected by the selector 35 is mapped into an internal frame in an internal-frame stuff generating circuit 36. At that time, stuff for absorbing the time-base change for an OTUk frame in the network is generated and inserted into the internal frame. The internal frame is transmitted through a cross connector and a multiplex separator (which are not illustrated) and is terminated in an internal-frame stuff terminating circuit 37 so as to be output as an ODUk frame.

The ODUk frame is supplied to an ODU-frame stuff terminating circuit 38, in which data, the clock, and a write enable signal are extracted from the ODUk frame and are supplied to a clock switch memory 39. Then, data in the payload area in the ODUk frame, i.e., client signal data, is written into the clock switch memory 39. The system clock generated in the clock generating circuit 26 is supplied to the internal-frame stuff generating circuit 36, the internal-frame stuff terminating circuit 37, the ODU-frame stuff terminating circuit 38, and the clock switch memory 39.

The ODU-frame stuff terminating circuit 38 specifies the positions of inserted stuff bytes on the basis of stuff information, i.e., JC bytes, extracted from the overhead of the ODUk frame, and generates a write enable signal instructing that the overhead area and the stuff bytes are not to be written and that only data parts of the payload area are to be written. Therefore, the write enable signal that is output from the ODU-frame stuff terminating circuit 38 corresponds to the transmission rate, i.e., the stuff information, of a client signal in a transmission apparatus on the transmission side.

In addition, the write enable signal that is output from the ODU-frame stuff terminating circuit 38 is supplied to a phase locked loop (PLL) 40 which serves as a phase synchronizing circuit. The PLL 40 generates a clock which is synchronized with the write enable signal and in which the transmission rate of a client signal is smoothed. The PLL 40 supplies the generated clock as a read clock to the clock switch memory 39 and also to a client transmission interface 41.

Thus, the client signal data is read from the clock switch memory 39 and is output as a client signal from the client transmission interface 41. The client signal is transmitted through a selector (SEL) 42, is converted into an optical signal by an electronic/optical converter 43, and is transmitted to the client transmission path.

An alarm signal that indicates occurrence of a signal disconnection or the like which is detected in the optical/electronic converter 31A or 31B or the OTU-frame synchronizing circuit 32A or 32B for the working or protection line is supplied to a switch controlling circuit (SW CONT) 45 via an OR circuit 34A or 34B. Under the control performed by the switch controlling circuit 45, the selector 35 selects either one of the output signals from the OTU-frame synchronizing circuits 32A and 32B and supplies the selected signal to the internal-frame stuff generating circuit 36, and the selector 42 selects either one of the client signal that is output from the client transmission interface 41 and an alarm indication signal (AIS) generated by an AIS generating circuit 44 and supplies the selected signal to the electronic/optical converter 43.

FIG. 5 illustrates a timing chart of an operation in which switching to the protection line side is performed. A redundant switching operation of an OTN transmission system will be described below. That is, the operations in which, when a line disconnection occurs in the working line in FIG. 4, switching to the protection line is performed will be described with reference to the timing chart in FIG. 5. In FIGS. 4 and 5, the symbol (A) denotes the state of the working line on the network side. The symbol (B) denotes the alarm detection result of the working line on the network side. The symbol (C) denotes a first control signal that is output from the switch controlling circuit 45 in order to select either the working line or the protection line on the network side. The symbol (D) denotes the state of the selected line. The symbol (E) denotes a second control signal that is output from the switch controlling circuit 45 in order to output an AIS that notifies the upper layer of a failure. The symbol (F) denotes an output signal of the client side interface. The symbol (G) denotes the operation of the PLL 40.

In FIG. 5, at time T11, a line disconnection occurs in the working line on the network side, and, at time T12, the OTU-frame synchronizing circuit 32A on the network side detects an alarm indicating the line disconnection. At time T13, the switch controlling circuit 45 switches from the working line to the protection line. At time T14, the PLL 40 completes a synchronous pull-in operation in the clock.

The time period for the redundant switching operation will be described below. The time period for detecting a line-disconnection alarm, i.e., between T11 and T12, is approximately 1 ms or less. The switching control time period, i.e., between T12 and T13, is approximately 40 ms. In the switching control time period, the oscillation frequency of the PLL 40 goes up to the maximum frequency or down to the minimum frequency. In this state, the PLL 40 oscillates at the possible maximum or minimum frequency. Since the PLL 40 starts a synchronous pull-in operation from the maximum or minimum frequency to the frequency of a client signal on the protection line side after the main signal is switched, the synchronous pull-in time (i.e., between T13 and T14) is approximately 3 sec or less. The above-described redundant switching operation takes up to approximately 3 sec.

A technology has been proposed which achieves uninterrupted switching in a data processing apparatus that supports redundant switching (for example, see Japanese Laid-open Patent Publication No. 2010-226200).

SUMMARY

According to an aspect of the invention, a transmission apparatus includes a network-side interface unit configured to receive a signal transmission frame into which a client signal is arranged from each of a working line and a protection line of a network, and extract the client signal from the received signal transmission frame, a client-side interface unit configured to transmit the extracted client signal to a client transmission path by using a clock generated by a phase synchronization circuit, based on frequency adjustment information of the client signal included in the signal transmission frame, a protection-line-side memory configured to store the frequency adjustment information of the client signal included in the signal transmission frame received from the protection line, and a switch controller configured to control the phase synchronization circuit so as to generate a clock by using the frequency adjustment information of the client signal stored in the protection-line-side memory when the signal transmission frame fails to be received from the working line.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a diagram illustrating the format of an ODUk frame;

FIG. 15 is a diagram illustrating the frame format of an alarm transfer LAN frame;

FIGS. 16A to 16I illustrate a timing chart of the case in which an optical input disconnection occurs on the working line side;

FIGS. 17A to 17H illustrate a timing chart of the case in which an optical input disconnection occurs on the working line side and in which recovery from the disconnection is then made immediately;

FIGS. 18A to 18H illustrate a timing chart of the case in which an optical input disconnection occurs on the working line side and in which an optical input disconnection occurs on the protection line side; and FIGS. 19A to 19H illustrate a timing chart of the case in which an optical input disconnection occurs on the protection line side and in which an optical input disconnection occurs on the working line side.

DESCRIPTION OF EMBODIMENT

The OTN transmission system is an upper layer of the SONET transmission system. Therefore, similar to the SONET transmission system, the switching operation using a redundant configuration is desirably completed within 50 ms. Thus, it is desirable that the synchronous pull-in time of a PLL be shortened. In the characteristics of a PLL, there is a trade-off relationship between the synchronous pull-in time and the output jitter. The output jitter increases as the synchronous pull-in time is shortened.

In the hierarchy of the OTN, only low-speed signals of STM-1 (approximately 150 Mbps) of the SDH standard may be transmitted in ODU0 (1.25G) signals. In this case, there are a few main signal components in a wide band of 1.25 Gbps, and extra signals are inserted (stuffed) into the remaining band. When a client signal is to be extracted from a stuffed signal, the stuff information is removed (destuffed). When a frequency component of 150 Mbps is extracted from a band of 1.25 Gbps, the phase fluctuation (GAP) becomes large and a PLL desirably removes the phase fluctuation. Therefore, the PLL desirably has jitter suppression characteristics, resulting in a long synchronous pull-in time. Due to the jitter suppression characteristics, the PLL desirably has the cutoff frequency of 1 Hz or less. In this case, the synchronous pull-in time is approximately 3 sec. As a result, it may be difficult to reduce the switching time to 50 ms or less.

Figure 6:
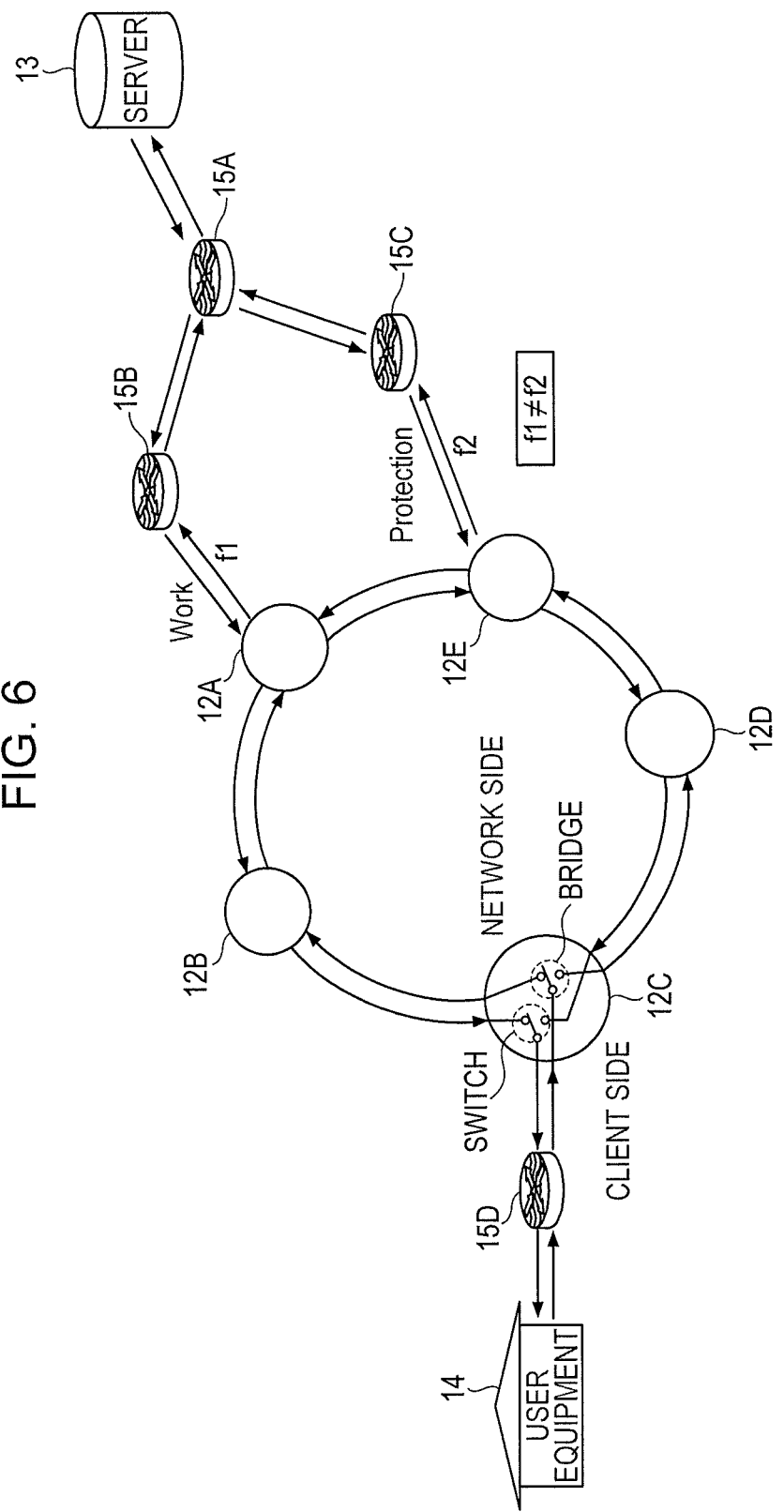
FIG. 6 is a configuration diagram illustrating an exemplary OTN transmission system in which redundant client signals operate asynchronously.

The OTN transmission system is based on an asynchronous network. Accordingly, client signals on the working line side and the protection line side which are included in a redundant configuration may operate asynchronously. FIG. 6 is a configuration diagram illustrating an exemplary OTN transmission system in which redundant client signals operate asynchronously.

In FIG. 6, transmission apparatuses 12A, 12B, 12C, 12D, and 12E form an OTN transmission system using a ring network. Between a server 13 and user equipment 14, a redundant configuration is provided which has a working line having a path of routers 15A and 15B, the transmission apparatuses 12A, 12B, and 12C, and a router 15D, and a protection line having a path of the router 15A, a router 15C, the transmission apparatuses 12E, 12D, and 12C, and the router 15D. A client signal is transmitted at a frequency f1 between the router 15B and the transmission apparatus 12A. A client signal is transmitted at a frequency f2 (f2≠f1) between the router 15C and the transmission apparatus 12E.

In this case, in the transmission apparatus 12C, when a redundant switching operation is performed, a PLL may desirably perform a synchronous pull-in operation on the client signals that have different frequencies, and it is desirable that the specification of 50 ms be satisfied also in this case.

An embodiment of a transmission apparatus to reduce the synchronous pull-in time of a phase synchronizing circuit will be described below on the basis of the drawings.

Transmission Apparatus of OTN Transmission System

Figure 1:
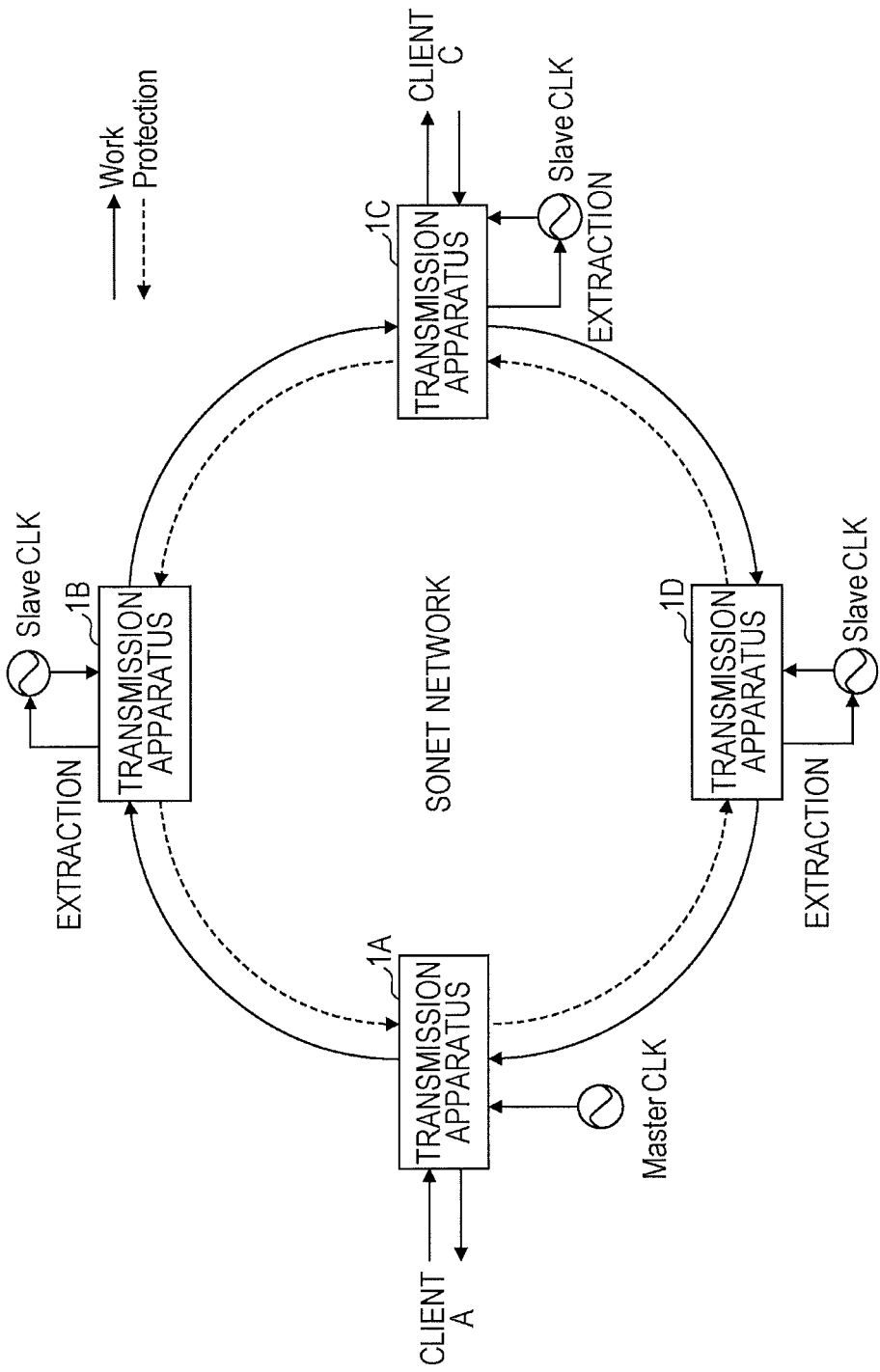
FIG. 1 is a configuration diagram illustrating an exemplary network of a SONET transmission system.
Figure 2:
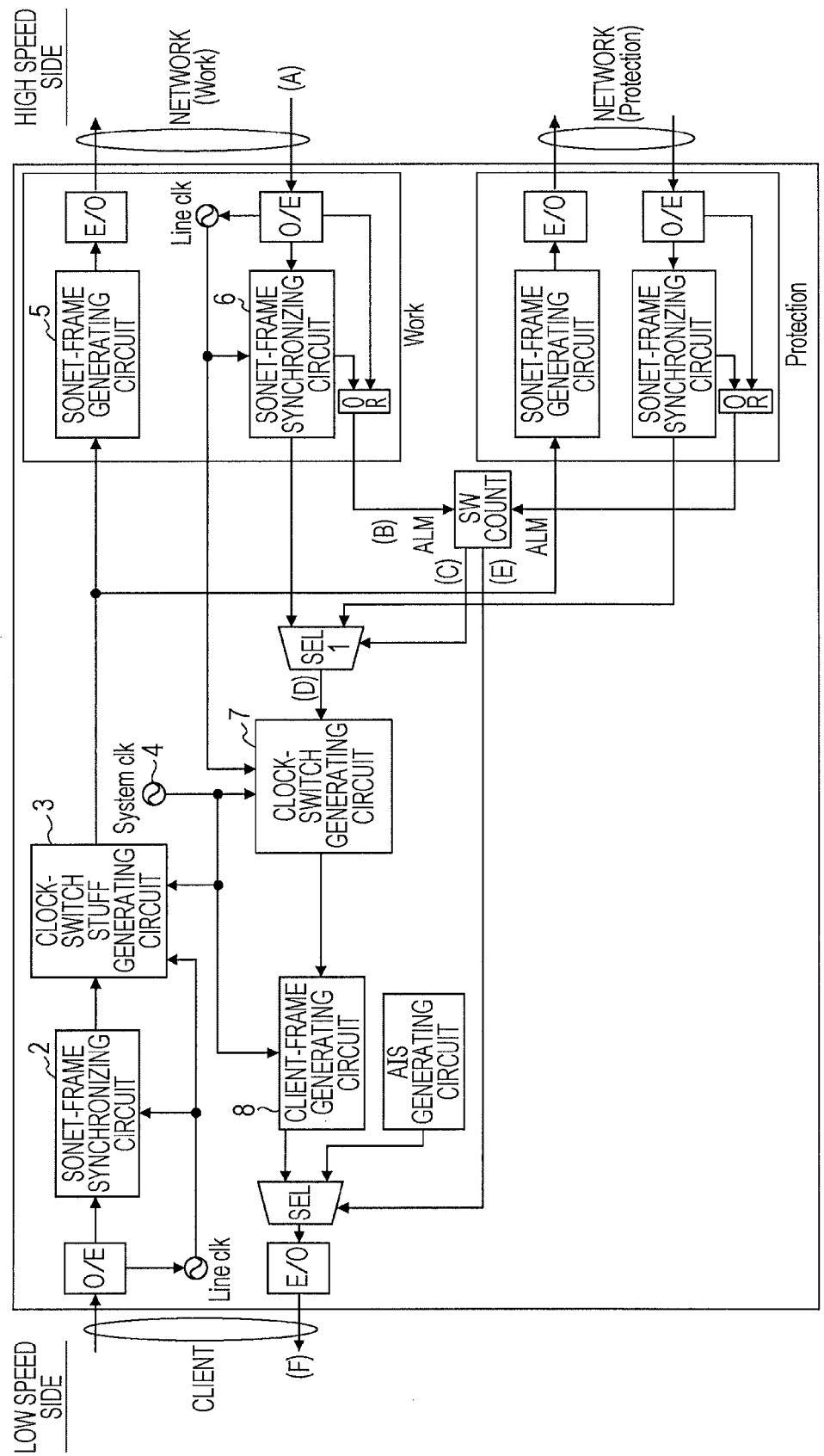
FIG. 2 is a configuration diagram illustrating an exemplary transmission apparatus in a SONET transmission system.
Figure 3:
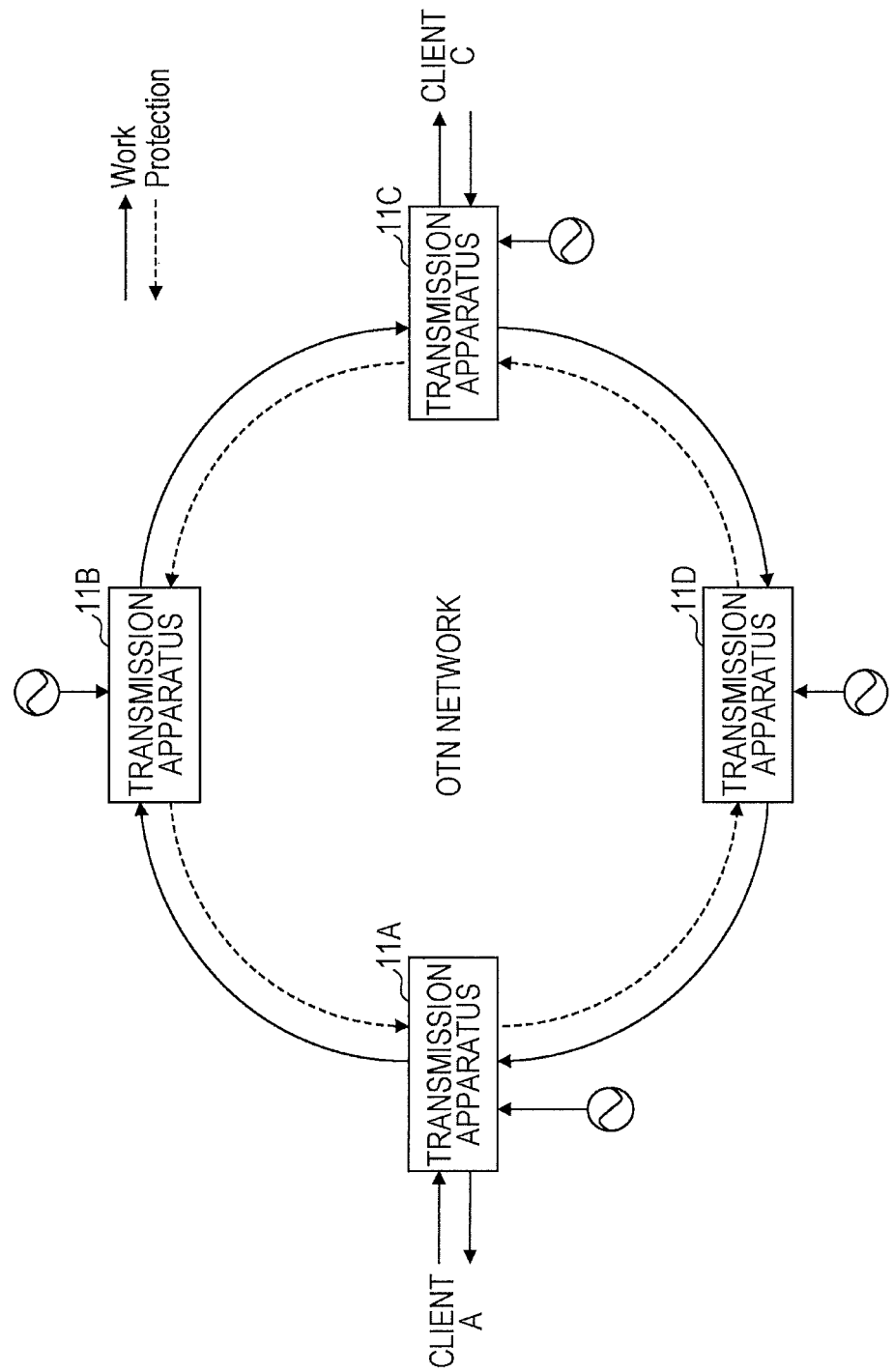
FIG. 3 is a configuration diagram illustrating an exemplary network of an OTN transmission system.
Figure 4:
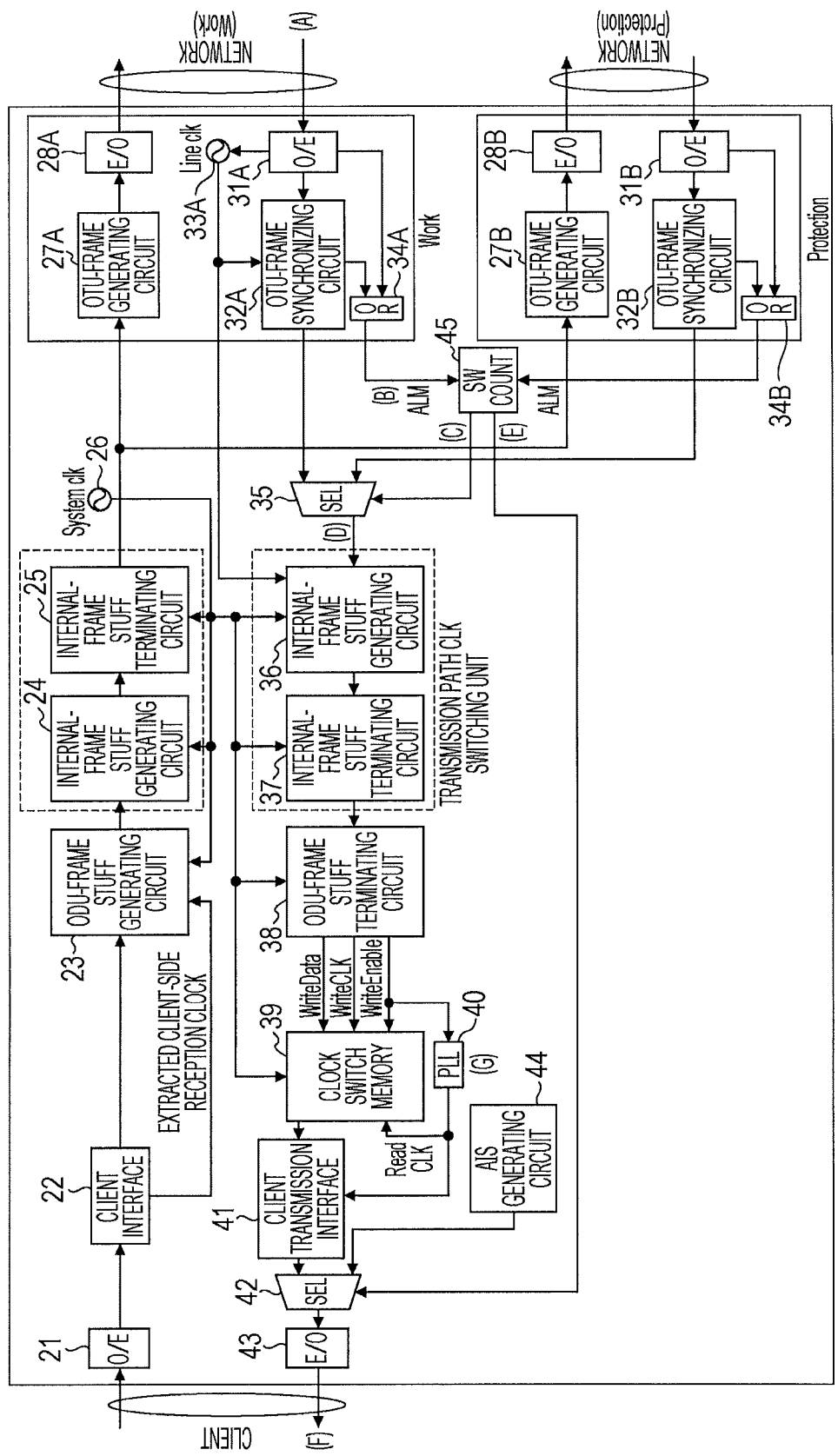
FIG. 4 is a configuration diagram illustrating an exemplary transmission apparatus of an OTN transmission system.
Figure 5:
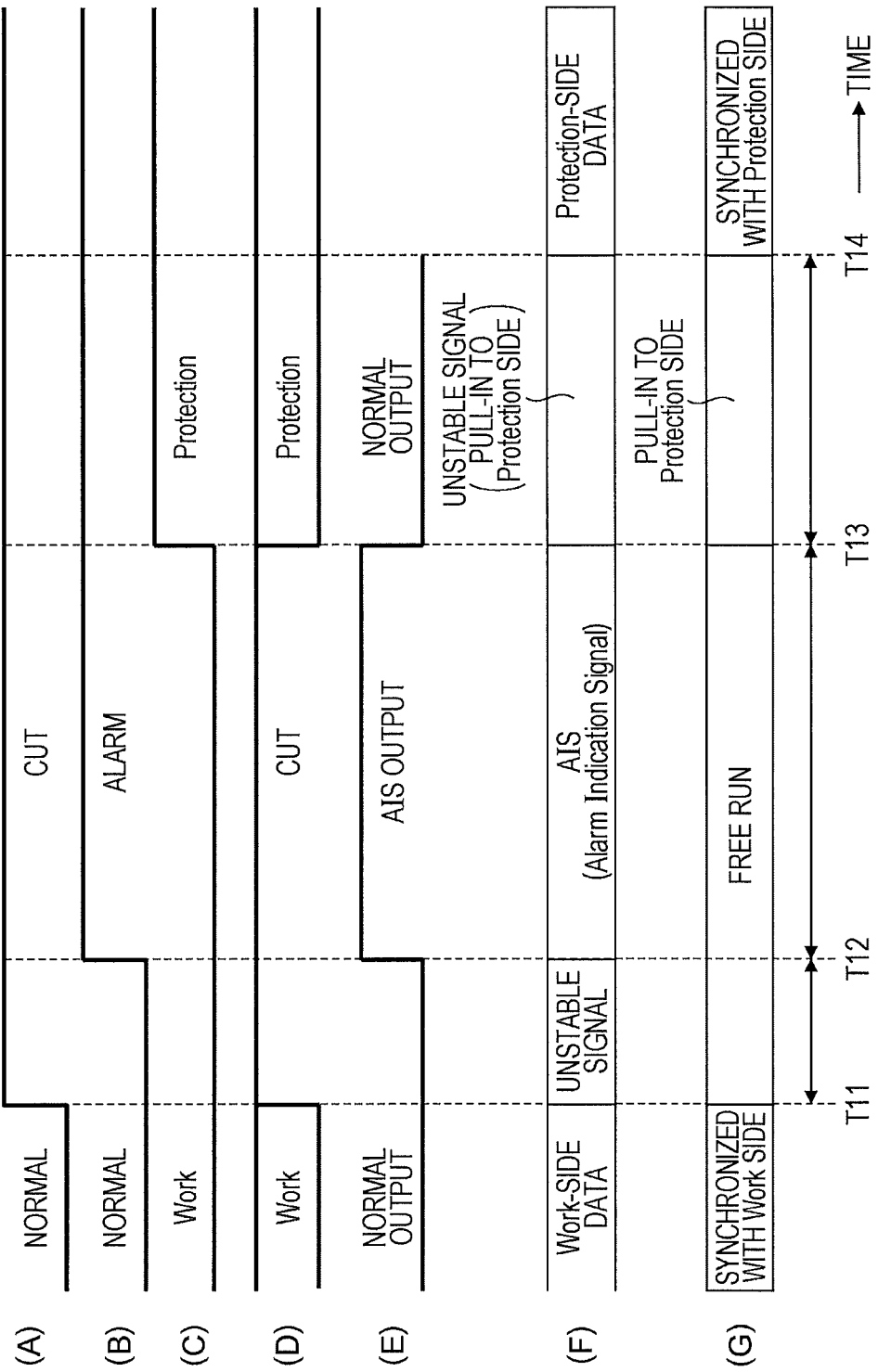
FIG. 5 is a timing chart of an operation in which switching to a protection line side is performed.
Figure 7A:
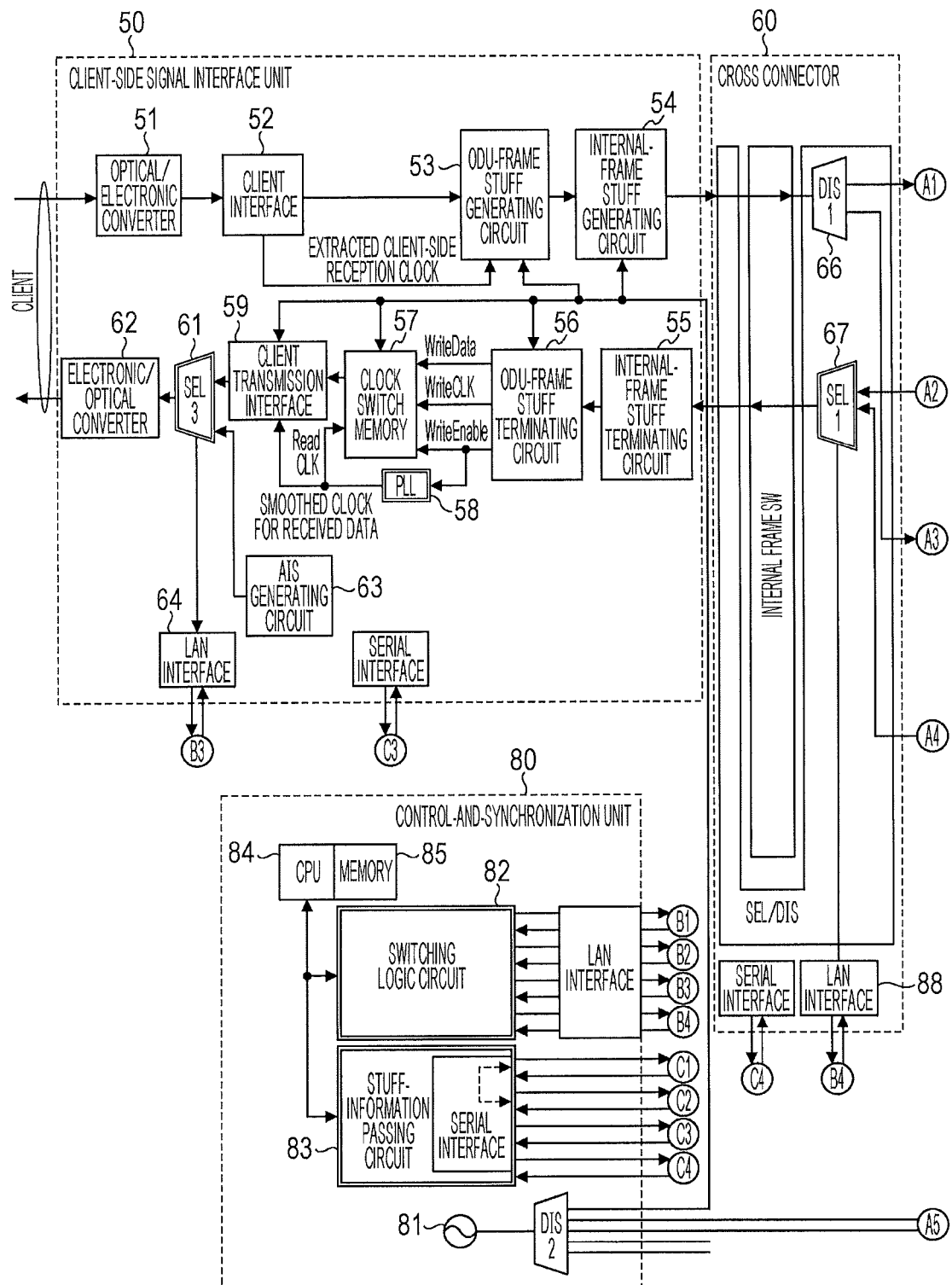
FIG. 7A is a configuration diagram illustrating an embodiment of a transmission apparatus of an OTN transmission system.
Figure 7B:
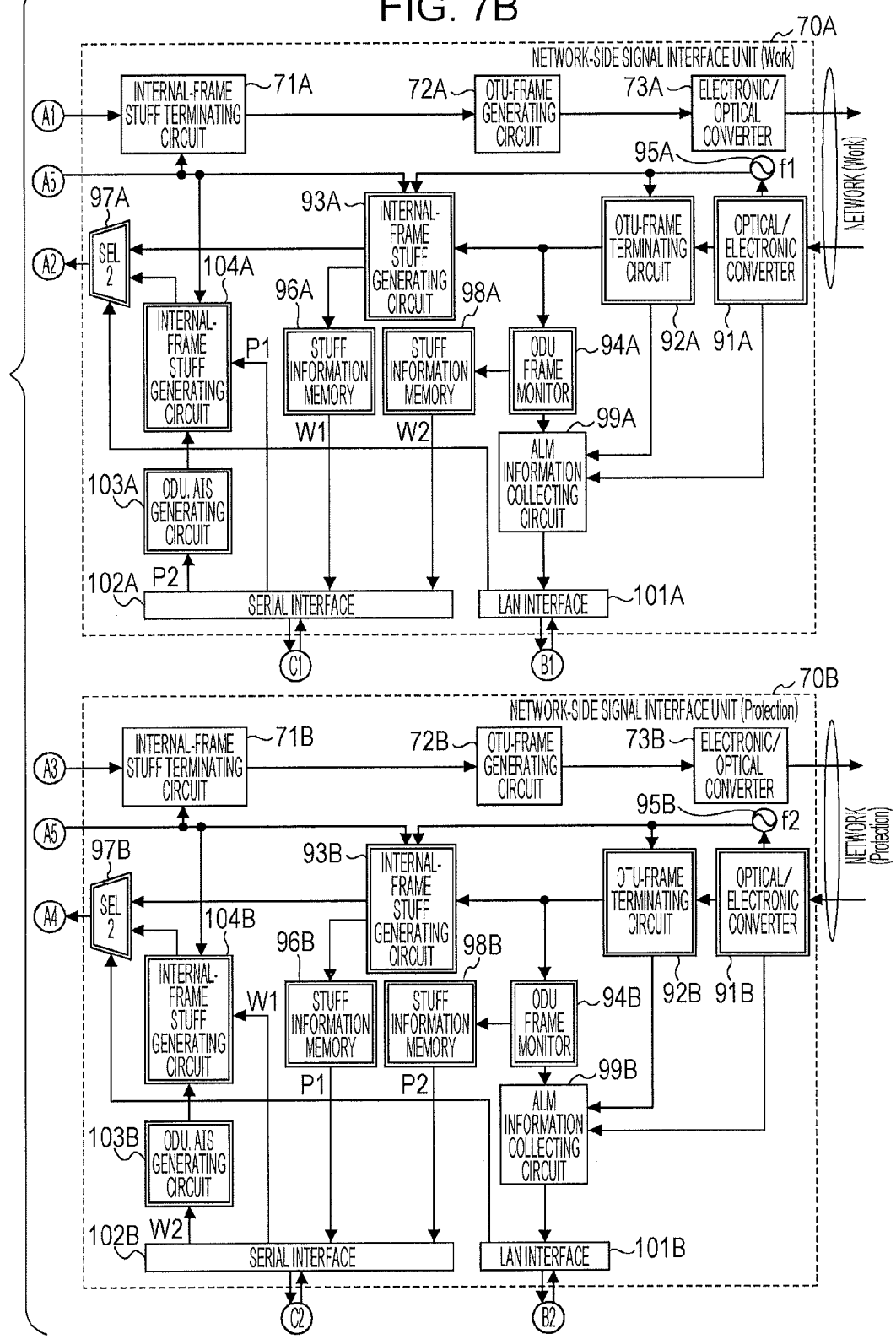
FIG. 7B is a configuration diagram illustrating an embodiment of a transmission apparatus of an OTN transmission system.

FIGS. 7A and 7B are configuration diagrams illustrating an embodiment of a transmission apparatus of an OTN transmission system. The transmission apparatus illustrated in FIGS. 7A and 7B is used, for example, as the transmission apparatuses 11A to 11D or 12A to 12E illustrated in FIG. 3 or 6.

Client-Side Signal Interface Unit and Cross Connector

In FIG. 7A, a client signal from a client transmission path is converted into an electric signal by an optical/electronic converter 51 in a client-side signal interface unit 50. After the client clock is extracted from the client signal in a client interface 52, the client signal is supplied to the ODU-frame stuff generating circuit 53. The ODU-frame stuff generating circuit 53 maps the client signal into an ODUk frame which serves as a signal transmission frame. At that time, JC bytes which serve as stuff information which is frequency adjustment information of a client signal are added to the overhead of the ODUk frame. According to the JC bytes, stuff bytes for absorbing the time-base change for the client signal are inserted into the payload area or the overhead area of the ODUk frame.

Frequency adjustment methods include the asynchronous mapping procedure (AMP) and the generalized mapping procedure (GMP).

In the AMP, the three JC bytes and a negative justification opportunity (NJO) byte in the optical channel payload unit k (OPUk) overhead, and positive justification opportunity (PJO) bytes in the OPUk payload are used to insert (stuff) data or stuff bytes (zero) into the NJO byte and the PJO bytes in accordance with the JC byte information. That is, the stuff positions at which stuff bytes are inserted are fixed. In the GMP, stuff bytes are uniformly inserted into the OPUk payload in accordance with six bytes of JC byte information of the OPUk overhead. The JC bytes of the AMP and the GMP are illustrated in FIG. 8 described below.

The ODUk frame that is output from the ODU-frame stuff generating circuit 53 is mapped into an internal frame in the internal-frame stuff generating circuit 54. In the internal frame, JC bytes serving as frequency adjustment information are added to the overhead area, and stuff bytes are added to the payload according to the GMP.

In FIG. 7A, the client-side signal interface unit 50 indicates only one circuit. However, more than one circuit may be provided.

A cross connector 60 performs cross connection on each of internal frames. The cross connector 60 uses a distributor 66 to supply an ODUk frame that is supplied from the client-side signal interface unit 50, to a network-side signal interface unit (Work) 70A and a network-side signal interface unit (Protection) 70B. The network-side signal interface units 70A, 70B are illustrated in FIG. 7B. The cross connector 60 uses a selector 67 to select an ODUk frame that is supplied from either one of the network-side signal interface units 70A and 70B, and supplies the selected frame to the client-side signal interface unit 50.

Network-Side Signal Interface Unit

An internal frame passes through the distributor 66 in the cross connector 60, and is supplied to an internal-frame stuff terminating circuit 71A of the network-side signal interface unit (Work) 70A and an internal-frame stuff terminating circuit 71B of the network-side signal interface unit (Protection) 70B, via terminals A1 and A3. The internal-frame stuff terminating circuits 71A and 71B terminate the internal frame, thereby extracting an ODUk frame.

A clock generating circuit 81 in a control-and-synchronization unit 80 illustrated in FIG. 7A generates the system clock and supplies the clock to the ODU-frame stuff generating circuit 53 and the internal-frame stuff generating circuit 54, and to, for example, the internal-frame stuff terminating circuits 71A and 71B illustrated in FIG. 7B via a terminal A5.

Each of an OTU-frame generating circuit 72A for the working line and an OTU-frame generating circuit 72B for the protection line adds an overhead and a forward error correction (FEC) to an ODUk frame that is output from a corresponding one of the internal-frame stuff terminating circuits 71A and 71B, so as to form an OTUk frame. Each of the OTUk frames is converted into an optical signal in a corresponding one of electronic/optical converters 73A and 73B, and the optical signal is transmitted to the OTN network.

Working System

In FIG. 7B, an OTU signal supplied from the working line of the OTN network is converted into an electric signal in an optical/electronic converter 91A, and is terminated in an OTU-frame terminating circuit 92A so that an ODUk frame is extracted from the OTU signal and is supplied to an internal-frame stuff generating circuit 93A and an ODU frame monitor 94A. A clock generating circuit 95A generates a clock that has a frequency f1 and that is synchronized with the network clock extracted from the OTU signal, and supplies the generated clock to, for example, the OTU-frame terminating circuit 92A and the internal-frame stuff generating circuit 93A.

The internal-frame stuff generating circuit 93A maps the ODUk frame into an internal frame. At that time, stuff bytes for absorbing the time-base change for an OTUk frame in the OTN network are generated and inserted into the internal frame. In the internal frame, JC bytes which serve as frequency adjustment information are added to the overhead area, and the stuff bytes are inserted into the payload in accordance with the GMP. The internal-frame stuff generating circuit 93A supplies the above-described internal-frame stuff information (W1) to a stuff information memory 96A into which the supplied information is written. The system clock from the clock generating circuit 81 is supplied to the internal-frame stuff generating circuit 93A and an internal-frame stuff generating circuit 104A via the terminal A5.

The ODU frame monitor 94A specifies positions at which the stuff bytes are inserted in the payload area on the basis of the stuff information, i.e., the JC bytes, extracted from the overhead of the ODUk frame, and supplies, for example, ODU-frame stuff information (W2) which indicates the insertion positions of the stuff bytes, to a stuff information memory 98A into which the supplied information is written. The ODU frame monitor 94A also detects alarm information from the overhead of the ODUk frame and supplies the detected information to an alarm information collecting circuit 99A.

When the optical/electronic converter 91A detects a disconnection of an optical signal, the optical/electronic converter 91A generates an alarm signal and supplies the generated alarm signal to the alarm information collecting circuit 99A. When the frame patterns of, for example, five successive ODUk frames do not match each other, the OTU-frame terminating circuit 92A generates an alarm signal and supplies the generated alarm signal to the alarm information collecting circuit 99A.

The alarm information collecting circuit 99A supplies the alarm signal which is collected from the optical/electronic converter 91A, the OTU-frame terminating circuit 92A, or the ODU frame monitor 94A, to a switching logic circuit 82 in the control-and-synchronization unit 80 through a LAN interface 101A and a terminal B1.

The stuff information (W1) of the stuff information memory 96A and the stuff information (W2) of the stuff information memory 98A on the working line side are supplied from a serial interface 102A via a terminal C1 to a stuff-information passing circuit 83 in the control-and-synchronization unit 80.

Internal-frame stuff information (P1) and ODU-frame stuff information (P2) on the protection line side are supplied from the stuff-information passing circuit 83 in the control-and-synchronization unit 80 via the terminal C1 to the serial interface 102A. The internal-frame stuff information (P1) is supplied to the internal-frame stuff generating circuit 104A, and the ODU-frame stuff information (P2) is supplied to an ODU.AIS generating circuit 103A.

The ODU.AIS generating circuit 103A generates an ODUk frame for failure notification in which the ODU-frame stuff information (P2) is included in the overhead and in which the entire payload area is filled with '1', and supplies the generated frame to the internal-frame stuff generating circuit 104A. The internal-frame stuff generating circuit 104A maps the ODUk frame for failure notification into an internal frame, and generates an internal frame for failure notification. At that time, stuff bytes are generated in accordance with the internal-frame stuff information (P1), and are inserted into the payload area of the internal frame for failure notification. The internal-frame stuff generating circuit 104A supplies the generated internal frame to a selector 97A.

The selector 97A is supplied with a first control signal from the switching logic circuit 82 in the control-and-synchronization unit 80 via the LAN interface 101A. The selector 97A selects an internal frame from the internal-frame stuff generating circuit 93A in the normal state, and an internal frame from the internal-frame stuff generating circuit 104A in the abnormal state, and supplies the selected frame to the selector 67 in the cross connector 60.

Protection System

Similarly, an OTU signal supplied from the protection line of the OTN network is converted into an electric signal in an optical/electronic converter 91B, and is terminated in an OTU-frame terminating circuit 92B so that an ODUk frame is extracted from the OTU signal and is supplied to an internal-frame stuff generating circuit 93B and an ODU frame monitor 94B. A clock generating circuit 95B generates a clock that has a frequency f2 and that is synchronized with the network clock extracted from the OTU signal, and supplies the generated clock to, for example, the OTU-frame terminating circuit 92B and the internal-frame stuff generating circuit 93B. The frequencies f1 and f2 may satisfy the condition f1≠f2 or may satisfy the condition f1=f2.

The internal-frame stuff generating circuit 93B maps the ODUk frame into an internal frame. At that time, stuff bytes for absorbing the time-base change for an OTUk frame in the OTN network are generated and inserted into the internal frame. In the internal frame, JC bytes which serve as frequency adjustment information are added to the overhead area, and the stuff bytes are inserted into the payload in accordance with the GMP. The internal-frame stuff generating circuit 93B supplies the above-described internal-frame stuff information (P1) to a stuff information memory 96B into which the supplied information is written. The system clock from the clock generating circuit 81 is supplied to the internal-frame stuff generating circuit 93B and an internal-frame stuff generating circuit 104B via the terminal A5.

The ODU frame monitor 94B specifies positions at which the stuff bytes are inserted in the payload area on the basis of the stuff information, i.e., the JC bytes, extracted from the overhead of the ODUk frame, and supplies, for example, ODU-frame stuff information (P2) which indicates the insertion positions of the stuff bytes, to a stuff information memory 98B into which the supplied information is written. The ODU frame monitor 94B also detects alarm information from the overhead of the ODUk frame and supplies the detected information to an alarm information collecting circuit 99B.

When the optical/electronic converter 91B detects a disconnection of an optical signal, the optical/electronic converter 91B generates an alarm signal and supplies the generated alarm signal to the alarm information collecting circuit 99B. When the frame patterns of, for example, five successive ODUk frames do not match each other, the OTU-frame terminating circuit 92B generates an alarm signal and supplies the generated alarm signal to the alarm information collecting circuit 99B.

The alarm information collecting circuit 99B supplies the alarm signal which is collected from the optical/electronic converter 91B, the OTU-frame terminating circuit 92B, or the ODU frame monitor 94B, to the switching logic circuit 82 in the control-and-synchronization unit 80 through a LAN interface 101B and a terminal B2.

The stuff information (P1) of the stuff information memory 96B and the stuff information (P2) of the stuff information memory 98B on the protection line side are supplied from a serial interface 102B via a terminal C2 to the stuff-information passing circuit 83 in the control-and-synchronization unit 80.

The internal-frame stuff information (W1) and the ODU-frame stuff information (W2) on the working line side are supplied from the stuff-information passing circuit 83 in the control-and-synchronization unit 80 via the terminal C2 to the serial interface 102B. The internal-frame stuff information (W1) is supplied to the internal-frame stuff generating circuit 104B, and the ODU-frame stuff information (W2) is supplied to an ODU.AIS generating circuit 103B.

The ODU.AIS generating circuit 103B generates an ODUk frame for failure notification in which the ODU-frame stuff information (W2) is included in the overhead and in which the entire payload area is filled with '1', and supplies the generated frame to the internal-frame stuff generating circuit 104B. The internal-frame stuff generating circuit 104B maps the ODUk frame for failure notification into an internal frame, and generates an internal frame for failure notification. At that time, stuff bytes are generated in accordance with the internal-frame stuff information (W1), and are inserted into the payload area of the internal frame for failure notification. The internal-frame stuff generating circuit 104B supplies the generated internal frame to a selector 97B.

The selector 97B is supplied with the first control signal from the switching logic circuit 82 in the control-and-synchronization unit 80 via the LAN interface 101B. The selector 97B selects an internal frame from the internal-frame stuff generating circuit 93B in the normal state, and an internal frame from the internal-frame stuff generating circuit 104B in the abnormal state, and supplies the selected frame to the selector 67 in the cross connector 60.

In FIG. 7A, the selector 67 in the cross connector 60 is supplied with a second control signal from the switching logic circuit 82 in the control-and-synchronization unit 80 via a LAN interface 88. The selector 67 selects an internal frame from the selector 97A in the normal state, and an internal frame from the selector 97B in the abnormal state, and supplies the selected frame to an internal-frame stuff terminating circuit 55 in the client-side signal interface unit 50.

Client-side Signal Interface Unit

In FIG. 7A, the internal-frame stuff terminating circuit 55 in the client-side signal interface unit 50 terminates an internal frame, and extracts an ODUk frame which is supplied to an ODU-frame stuff terminating circuit 56. The ODU-frame stuff terminating circuit 56 terminates the ODUk frame, and supplies the payload area data, the clock, and a write enable signal of the ODUk frame to a clock switch memory 57. Thus, the payload area data in the ODUk frame, i.e., the client signal data, is extracted and written into the clock switch memory 57.

The system clock from the clock generating circuit 81 is supplied to the internal-frame stuff terminating circuit 55, the ODU-frame stuff terminating circuit 56, and the clock switch memory 57.

The ODU-frame stuff terminating circuit 56 specifies the positions of inserted stuff bytes on the basis of ODU stuff information, i.e., JC bytes, extracted from the overhead of the ODUk frame, and generates a write enable signal instructing that the overhead area and the stuff bytes are not to be written and that only data parts in the payload area are to be written. Therefore, the write enable signal that is output from the ODU-frame stuff terminating circuit 56 corresponds to the transmission rate, i.e., the stuff information, of a client signal in a transmission apparatus on the transmission side.

In addition, the write enable signal that is output from the ODU-frame stuff terminating circuit 56 is supplied to a PLL 58 which serves as a phase synchronizing circuit. The PLL 58 generates a clock which is synchronized with the write enable signal and in which the transmission rate of a client signal is smoothed. The PLL 58 supplies the generated clock as a read clock to the clock switch memory 57 and also to a client transmission interface 59.

Thus, the client signal data is read from the clock switch memory 57 and is output as a client signal from the client transmission interface 59. The client signal is transmitted through a selector 61, is converted into an optical signal by an electronic/optical converter 62, and is transmitted to the client transmission path.

The selector 61 selects either one of a client signal that is output from the client transmission interface 59 and an alarm indication signal (AIS) that is generated by an AIS generating circuit 63, in accordance with a third control signal supplied from the switching logic circuit 82 in the control-and-synchronization unit 80 via a LAN interface 64, and supplies the selected signal to the electronic/optical converter 62.

The control-and-synchronization unit 80 includes the clock generating circuit 81, the switching logic circuit 82, the stuff-information passing circuit 83, a CPU 84, and a memory 85. The CPU 84 executes programs stored in the memory 85, thereby controlling the switching of an internal frame in the cross connector 60. The CPU 84 also controls the passing of the stuff information (W1, W2, P1, and P2) performed by the stuff-information passing circuit 83, and controls the switching in the selectors 61, 67, 97A, and 97B through the switching logic circuit 82 in accordance with the alarm signal supplied to the switching logic circuit 82.

Operations of Units

The OTU-frame terminating circuit 92A terminates an ODUk frame, and detects an alarm. The ODU frame monitor 94A extracts the stuff information from an ODUk frame.

FIG. 8 illustrates the format of an ODUk frame. An ODUk frame consists of 4 rows and 3824 columns, and includes an overhead (OH) area and an OPUk payload where k is zero or a positive integer. In the overhead area, the area in the 15th to 16th columns and the first to fourth rows is regarded as an OPUk overhead, and JC bytes are added as stuff information which is frequency adjustment information of a client signal.

Frequency adjustment methods include the AMP and the GMP. In the AMP, the three JC bytes and a negative justification opportunity (NJO) byte in the OPUk overhead, and positive justification opportunity (PJO) bytes in the OPUk payload are used to insert (stuff) data or stuff bytes (zero) into the NJO byte and the PJO bytes in accordance with the JC byte information. That is, the stuff positions at which stuff bytes are inserted are fixed. In the GMP, stuff bytes are uniformly inserted into the OPUk payload in accordance with six bytes of JC byte information, i.e., JC1 to JC6, of the OPUk overhead.

The ODU frame monitor 94A writes the stuff information, i.e., JC bytes, extracted from an ODUk frame, as the ODU-frame stuff information (W2) into the stuff information memory 98A. Similarly, the ODU frame monitor 94B on the protection line side writes the stuff information, i.e., JC bytes, extracted from an ODUk frame, as the ODU-frame stuff information (P2) into the stuff information memory 98B.

Figure 9:
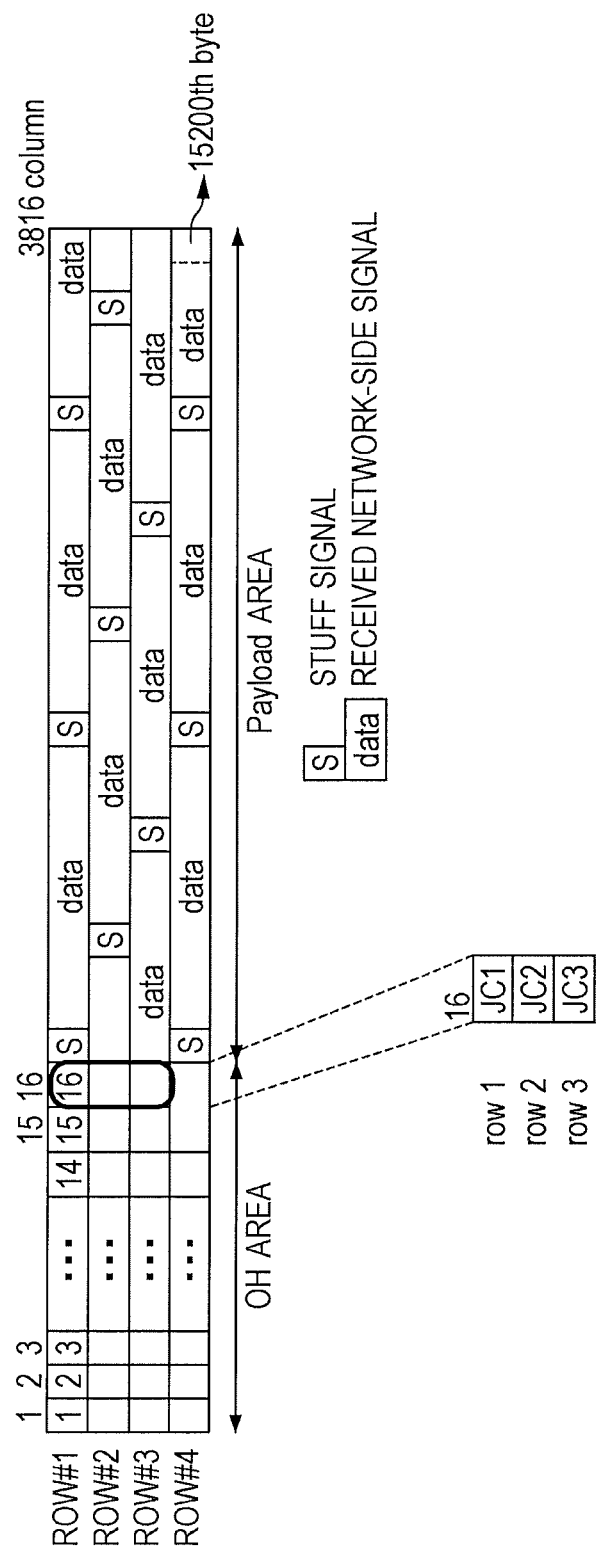
FIG. 9 is a diagram illustrating the format of an internal frame.

The internal-frame stuff generating circuit 93A maps an ODUk frame into an internal frame. FIG. 9 illustrates the format of an internal frame. An internal frame consists of 4 rows and 3816 columns. In the overhead area of an internal frame, the area in the 16th column and the first to third rows stores the JC bytes, e.g., three bytes, according to the GMP. This stuff information is information for absorbing the time-base change for an OTUk frame in the OTN network. In the payload area of an internal frame, stuff byte data which is represented by 'S' is inserted between pieces of data, each of which is represented by "data", in accordance with the above-described stuff information. For example, in the case where an internal frame stores an ODU0 frame, the amount of data stored in the payload area (15200 bytes) of an internal frame, i.e., the number of bytes in the ODU0 payload, is stored in the JC bytes.

The ratio of the payload size to the entire frame size in the internal frame format is equal to (3816−16)/3816, i.e., 3800/3816. An internal frame is generated by using the system clock having a frequency $f_{SYS}$ which is used inside the apparatus, and the signal speed of the payload of an internal frame is equal to $f_{SYS} \times (3800/3816)$.

The internal-frame stuff generating circuit 93A writes the above-described stuff information, i.e., JC bytes, as the internal-frame stuff information (W1) into the stuff information memory 96A. Similarly, the internal-frame stuff generating circuit 93B on the protection line side writes the stuff information, i.e., JC bytes, of an internal frame as the internal-frame stuff information (P1) into the stuff information memory 96B.

For example, the internal-frame stuff information P1 indicates that how many bytes in the internal-frame payload which consists of 3800×4 bytes, i.e., 15200 bytes, are used when an ODU frame is mapped into an internal frame. The speed ratio of an ODU signal to the payload of an internal frame is equal to P1/15200. Thus, the signal speed $f_{ODU}$ of an ODU signal is expressed by the following equation.

$$f_{ODU} = f_{SYS} \times (3800/3816) \times (P1/15200)$$

The internal-frame stuff information P1 ranges from 0 to 15200. That is, $f_{SYS}$ is desirably larger than the value obtained by $f_{ODU} \times (3816/3800)$. The value $f_{SYS}$ may be set to a value larger than the value obtained by $f_{ODU} \times (3816/3800)$. That is, an internal frame itself is smaller than an ODU frame, whereas the signal speed of an internal frame is higher than that of an ODU frame. An image for this is that, for example, 10 ODU frames are mapped into 11 internal frames.

Figure 10:
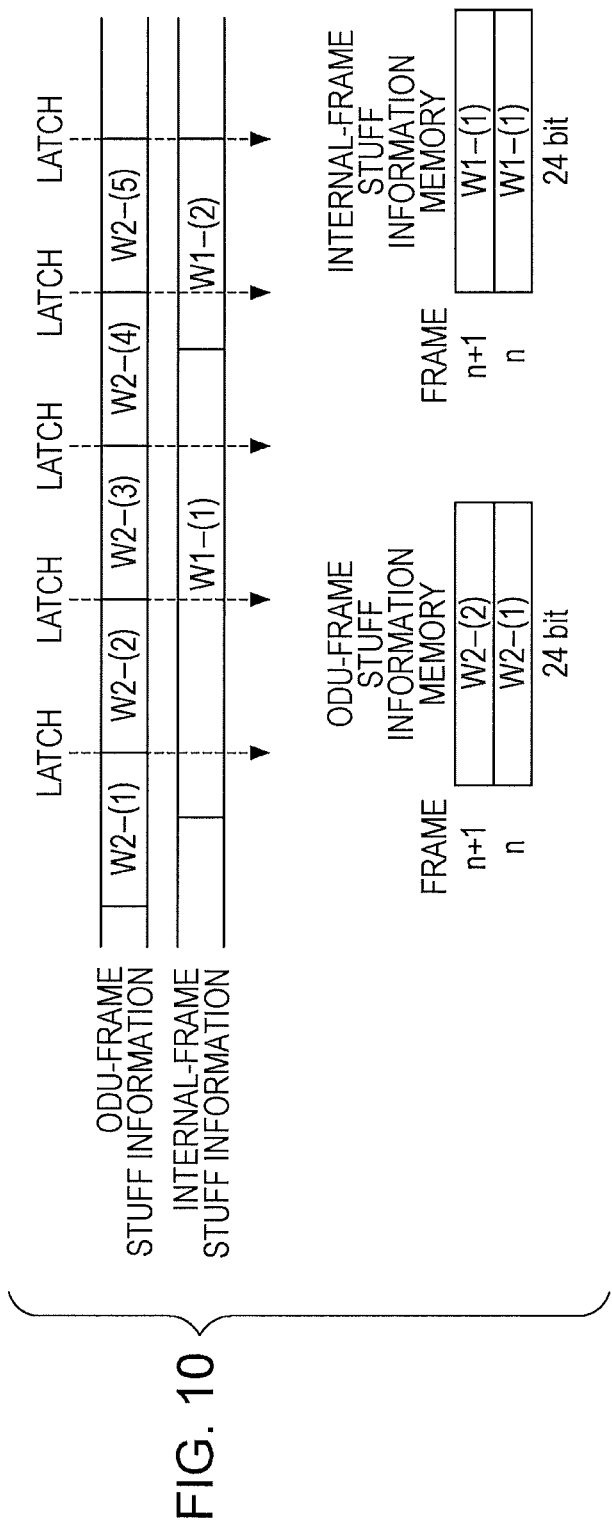
FIG. 10 is a diagram for describing writing of stuff information into a stuff information memory.
Figure 11:
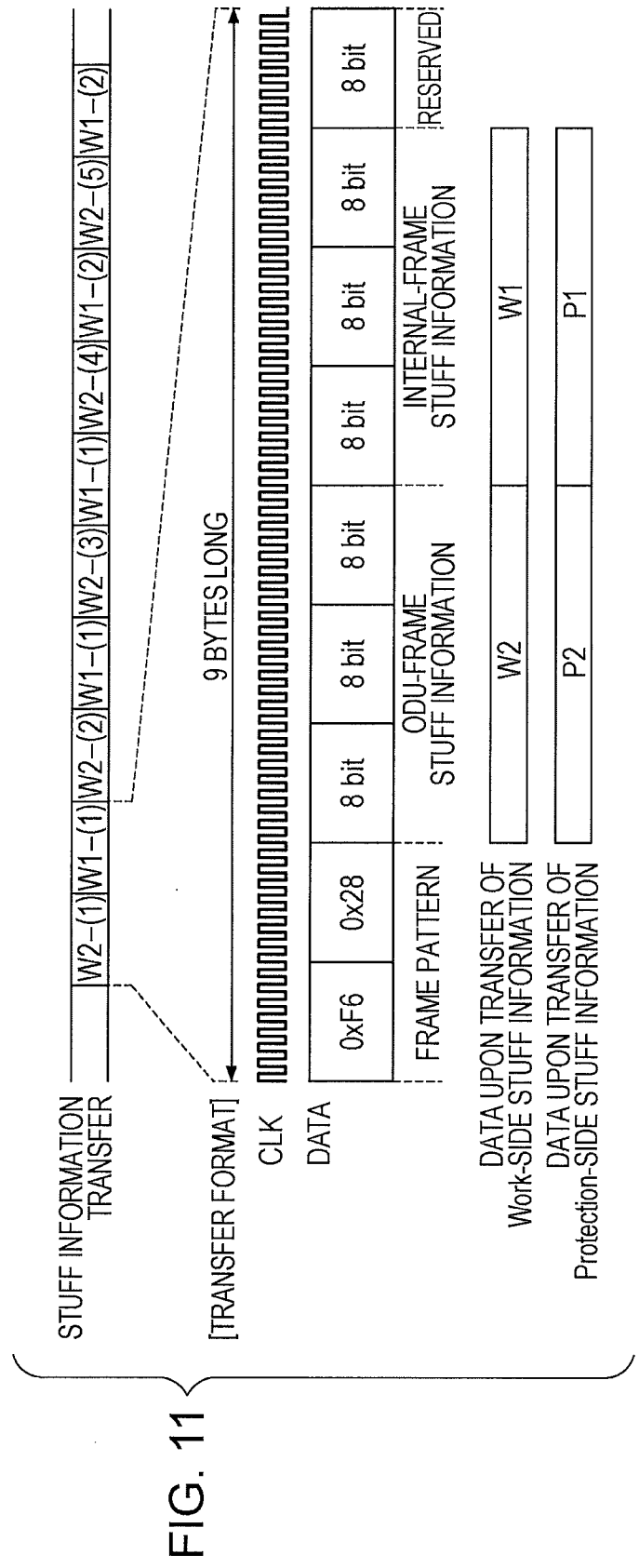
FIG. 11 is a diagram for describing transfer of stuff information.

As illustrated in FIG. 10, internal-frame stuff information (W1-(1) and W1-(2)) and ODU-frame stuff information (W2-(1) to W2-(5)) are latched, i.e., written, into the stuff information memories 96A and 98A at the timing at which an ODU frame is completed. As illustrated in FIG. 11, the serial interface 102A transfers the internal-frame stuff information (W1) and the ODU-frame stuff information (W2) to the stuff-information passing circuit 83 in a transfer format of 9 bytes in which frame patterns (0xF6 and 0x28, where 0x indicates that the value is hexadecimal) are added. Similarly, the serial interface 102B on the protection line side transfers the internal-frame stuff information (P1) and the ODU-frame stuff information (P2) to the stuff-information passing circuit 83.

The stuff-information passing circuit 83 transfers the internal-frame stuff information (W1) and the ODU-frame stuff information (W2) on the working line side to the serial interface 102B on the protection line side, and transfers the internal-frame stuff information (P1) and the ODU-frame stuff information (P2) on the protection line side to the serial interface 102A on the working line side.

Figure 12:
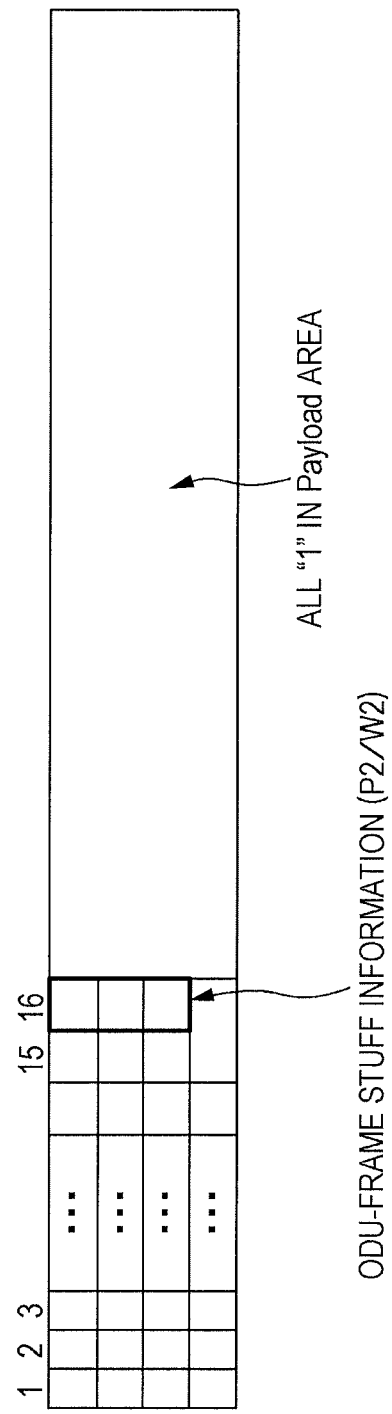
FIG. 12 is a diagram illustrating the state of an ODUk frame for failure notification.

The ODU.AIS generating circuit 103A on the working line side generates an ODUk frame for failure notification in which the ODU-frame stuff information (P2) is included in the overhead and in which the entire payload area is filled with '1'. FIG. 12 illustrates the state of an ODUk frame for failure notification. Similarly, the ODU.AIS generating circuit 103B on the protection line side generates an ODUk frame for failure notification in which the ODU-frame stuff information (W2) is included in the overhead and in which the entire payload area is filled with '1'.

Figure 13:
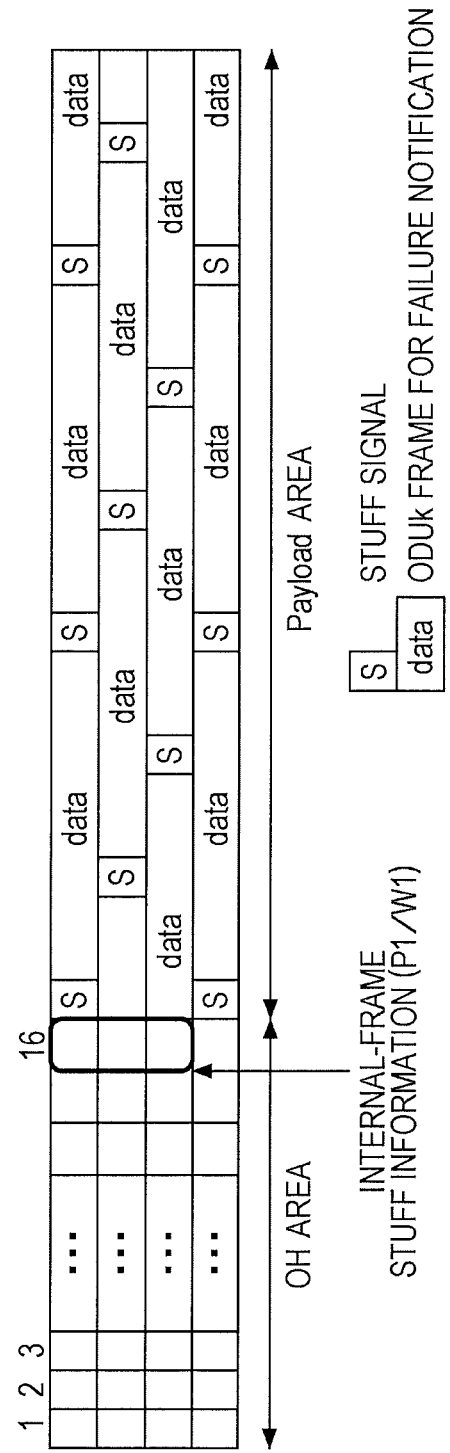
FIG. 13 is a diagram illustrating the state of an internal frame for failure notification.

The internal-frame stuff generating circuit 104A generates an internal frame for failure notification in which the internal-frame stuff information (P1) is included in the overhead and into which the ODUk frame for failure notification is mapped. FIG. 13 illustrates the state of an internal frame for failure notification. Similarly, the internal-frame stuff generating circuit 104B on the protection line side generates an internal frame for failure notification in which the internal-frame stuff information (W1) is included in the overhead and into which the ODUk frame for failure notification is mapped.

ODU.AIS Generating Circuit and Internal-Frame Stuff Generating Circuit

Figure 14:
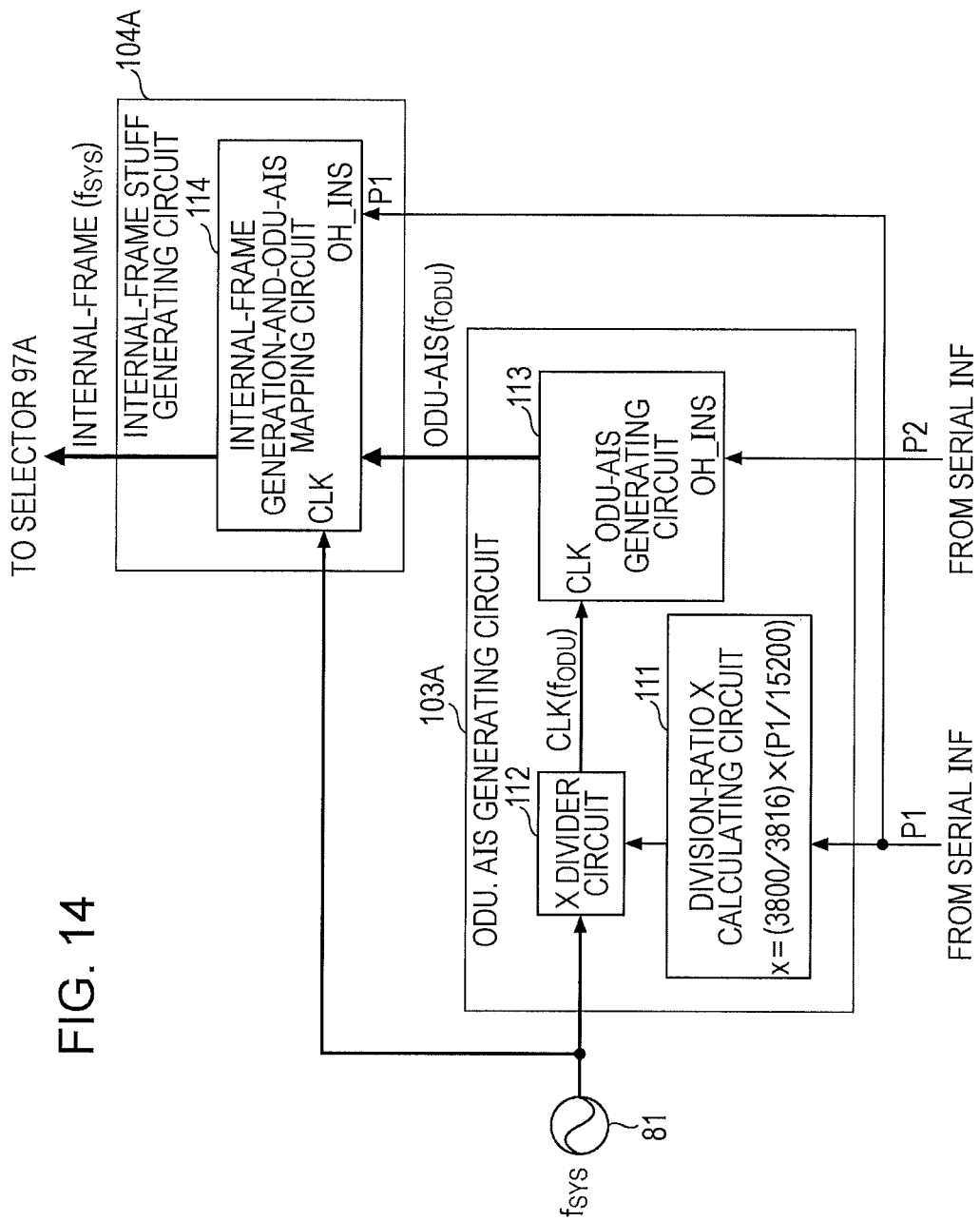
FIG. 14 is a detailed configuration diagram of an ODU.AIS generating circuit and an internal-frame stuff generating circuit.

FIG. 14 is a detailed configuration diagram of the ODU.AIS generating circuit 103A and the internal-frame stuff generating circuit 104A on the working line side. The ODU.AIS generating circuit 103B and the internal-frame stuff generating circuit 104B on the protection line side have a similar configuration. In FIG. 14, the ODU.AIS generating circuit 103A includes a division-ratio x calculating circuit 111, an x divider circuit 112, and an ODU-AIS generating circuit 113. The internal-frame stuff generating circuit 104A includes an internal-frame generation-and-ODU-AIS mapping circuit 114.

The internal-frame stuff information (P1) from the serial interface 102A indicates the number of bytes of the ODU signal that is mapped into one internal frame, and is supplied to the division-ratio x calculating circuit 111 and the internal-frame generation-and-ODU-AIS mapping circuit 114. The ODU-frame stuff information (P2) indicates the number of bytes of the client signal that is mapped into one ODU frame, and is supplied to the ODU-AIS generating circuit 113.

The division-ratio x calculating circuit 111 uses the internal-frame stuff information (P1), the value of 15200 which is the total number of bytes of the payload of an internal frame, and a ratio of the payload size to the entire frame size in the internal frame format, i.e., 3800/3816, to calculate a division ratio x by using the following equation.

$$x=(3800/3816) \times (P1/15200)$$

The division ratio x is supplied to the x divider circuit 112. The x divider circuit 112 divides the system clock having the frequency $f_{SYS}$ which is supplied from the clock generating circuit 81 in the control-and-synchronization unit 80 by the division ratio x. The x divider circuit 112 generates a clock CLK ($f_{ODU}$) having the frequency $f_{ODU}$ which corresponds to the bit rate of the ODU signal on the protection line side, and supplies the generated clock to the clock terminal of the ODU-AIS generating circuit 113.

The ODU-AIS generating circuit 113 generates an ODU-AIS ($f_{ODU}$) for failure notification generated by inserting the ODU-frame stuff information (P2) into the overhead area of an ODUk frame and by filling the payload with '1', and supplies the ODU-AIS ($f_{ODU}$) to the internal-frame generation-and-ODU-AIS mapping circuit 114. The internal-frame generation-and-ODU-AIS mapping circuit 114 outputs an internal frame ($f_{SYS}$) for failure notification which has the system clock of the frequency $f_{SYS}$ and which is generated by inserting the internal-frame stuff information (P1) into the overhead area of an internal frame, by arranging stuff bytes in the payload in the proportion of the division ratio x, and by inserting data of '1' into the payload.

Figure 15:
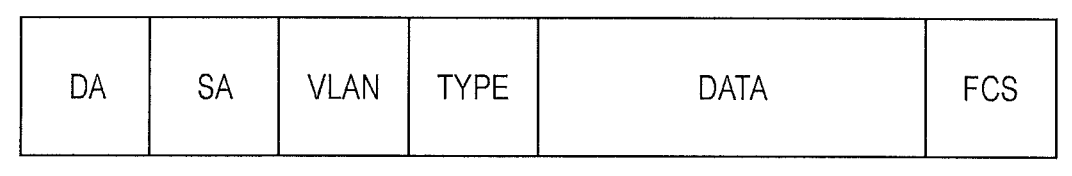

The alarm information collecting circuits 99A and 99B collect alarm signals from the optical/electronic converters 91A and 91B, the OTU-frame terminating circuits 92A and 92B, and the ODU frame monitors 94A and 94B, respectively. When an alarm signal is collected, the alarm information collecting circuits 99A and 99B notify the switching logic circuit 82 in the control-and-synchronization unit 80 of the alarm signal via the LAN interfaces 101A and 101B, respectively. FIG. 15 illustrates the frame format of an alarm transfer LAN frame. A LAN frame includes a destination address (DA), a sender address (SA), a virtual local area network (VLAN) tag, a field TYPE, a field DATA, and a frame check sequence (FCS). An alarm signal is set in the field DATA.

When an alarm signal is supplied from the alarm information collecting circuit 99A on the working line side, the control-and-synchronization unit 80 controls the selector 97A on the working line side by using the first control signal to switch from the selection of a signal from the internal-frame stuff generating circuit 93A to that from the internal-frame stuff generating circuit 104A. After the switching of the selector 97A, the PLL 58 starts a synchronous pull-in operation to achieve synchronization with the protection line side. The control-and-synchronization unit 80 controls the selector 61 by using the third control signal to switch from the selection of a signal from the client transmission interface 59 to that from the AIS generating circuit 63, and transmits an AIS to a client.

The control-and-synchronization unit 80 monitors alarm signals on the working line side and those on the protection line side. When no alarm signals on the protection line side are transmitted, in order to switch to the line on the protection line side, the control-and-synchronization unit 80 controls the selector 67 of the cross connector 60 by using the second control signal to switch from the selection of an output signal from the selector 97A to that from the selector 97B.

After the switching of the selector 67, the control-and-synchronization unit 80 controls the selector 61 by using the third control signal to switch from the selection of a signal from the AIS generating circuit 63 to that from the client transmission interface 59. At that time, since the synchronous pull-in operation for achieving synchronization with the protection line side is already completed, the PLL 58 may restart the passing of the main signal on the protection line side without performing another synchronous pull-in operation, reducing the synchronous pull-in time of the PLL 58.

First Case of Failure on Working Line Side

The case in which an optical input disconnection occurs in the network-side signal interface unit (Work) 70A will be described on the basis of the timing chart in FIGS. 16A to 16I.

As illustrated in FIG. 16A, in the network-side signal interface unit 70A on the working line side among the network-side signal interface units 70A and 70B, an optical input disconnection occurs at time T21.

As illustrated in FIG. 16B, at time T22 when a time period for alarm detection has elapsed, the optical/electronic converter 91A detects an alarm.

As illustrated in FIG. 16C, using the above-described alarm detection as a trigger, the selector 97A is switched. The selector 97A outputs the main signal on the working line side in the normal state before time T21, outputs an unstable signal from time T21 to time T22, and outputs an AIS having stuff information of the main signal on the protection line side after time T22. FIG. 16D illustrates the state of the selector 97B.

After the switching of the selector 97A at time T22, the control-and-synchronization unit 80 starts a switching process. As illustrated in FIG. 16E, at time T23 which is a time point after the process is completed, the selector 67 is switched. The selector 67 outputs the main signal on the working line side before time T21, outputs an unstable signal from time T21 to time T22, outputs an AIS having stuff information of the main signal on the protection line side from time T22 to time T23, and outputs the main signal on the protection line after time T23. The time period from time T22 to time T23 is a certain time period of, for example, about 30 ms.

As illustrated in FIG. 16F, the selector 61 is switched at times T22 and T23. The selector 61 outputs the main signal on the working line side before time T21, outputs an unstable signal from time T21 to time T22, outputs an AIS generated by the AIS generating circuit 63 from time T22 to time T23, and outputs the main signal on the protection line side after time T23.

As illustrated in FIG. 16G, the PLL 58 is synchronized with the write enable signal of the main signal on the working line side before time T21, and is in a free-run state from time T21 to time T22 in which the output frequency of the PLL 58 is changed from a frequency F1 to a frequency F3. The PLL 58 starts a synchronous pull-in operation to achieve synchronization with the write enable signal of the main signal on the protection line side from time T22, and the output frequency of the PLL 58 is changed from the frequency F3 to a frequency F2. After time T22a, the PLL 58 is synchronized with the write enable signal of the main signal on the protection line side. FIG. 16H illustrates the output frequency of the PLL 58 by using a solid line. The frequency F1 is a frequency of the write enable signal of the main signal on the working line side. The frequency F2 is a frequency of the write enable signal of the main signal on the protection line side. The frequency F3 is a frequency of the PLL 58 which is in the free-run state.

As illustrated in FIG. 16I, the PLL 58 in a circuit of related art is in a free-run state from time T21 to time T23. Thus, as illustrated in FIG. 16H by using a dashed line, the output frequency of the PLL 58 is changed from the frequency F1 to a frequency F4 which is the minimum frequency of the free-run state of the PLL 58 (F4<F3).

In the present embodiment, upon alarm detection, a synchronous pull-in operation for achieving synchronization with the frequency F2 of the write enable signal of the main signal on the protection line is started, accordingly reducing the synchronous pull-in time. The maximum alarm detection time is 0.1 ms, during which the PLL 58 is in the free-run state. However, since the time period is short, the oscillation frequency of the PLL 58 does not reach the maximum frequency or the minimum frequency. The offset of the frequency of the PLL 58 is about 0.3 ppm in 0.1 ms. Thus, the output frequency of the PLL 58 is changed in a range down to the frequency F3. Accordingly, the frequency difference is small, and the synchronous pull-in time is substantially reduced compared with that of related art. Thus, a synchronous pull-in operation may be started from an earlier time point, and the synchronous pull-in time may be reduced. This enables the switching to the protection line side to be achieved at time T22a which is a time point within 50 ms (about 30 ms) from time T22.

Second Case of Failure on Working Line Side and Immediate Recovery

The case in which an optical input disconnection occurs in the network-side signal interface unit (Work) 70A and in which recovery from the disconnection is immediately made will be described on the basis of the timing chart in FIGS. 17A to 17H.

As illustrated in FIG. 17A, in the network-side signal interface unit 70A on the working line side among the network-side signal interface units 70A and 70B, an optical input disconnection occurs at time T31, and recovery from the disconnection is immediately made at time T31a.

As illustrated in FIG. 17B, at time T32 when a time period for alarm detection has elapsed, the optical/electronic converter 91A detects an alarm, and the normal state is immediately recovered at time T32a.

As illustrated in FIG. 17C, using the above-described alarm detection as a trigger, the selector 97A is switched. After the signal is returned back from the alarm signal to the normal signal, a signal on the protection line side is still selected during the time period for switch-back protection (from time T32a to time T33). The selector 97A outputs the main signal on the working line in the normal state before time T31, outputs an unstable signal from time T31 to time T32, and outputs an AIS having stuff information of the main signal on the protection line side from time T32 to time T33. The selector 97A outputs the main signal on the working line side after time T33. FIG. 17D illustrates the state of the selector 97B.

After the switching of the selector 97A at time T32, the control-and-synchronization unit 80 starts a switching process. However, in the time period from time T32 to time T33, since a certain time period, e.g., 30 ms, has not elapsed, as illustrated in FIG. 17E, the selector 67 is not switched. This is because the signal has been returned back from the alarm signal to the normal signal before the certain time period elapses. The selector 67 outputs the main signal on the working line side before time T31, outputs an unstable signal from time T31 to time T32, outputs an AIS having stuff information of the main signal on the protection line side from time T32 to time T33, and outputs the main signal on the working line side after time T33.

As illustrated in FIG. 17F, the selector 61 is switched at times T32 and T33. The selector 61 outputs the main signal on the working line side before time T31, outputs an unstable signal from time T31 to time T32, outputs an AIS generated by the AIS generating circuit 63 from time T32 to time T33, and outputs the main signal on the working line side after time T33.

As illustrated in FIG. 17G, the PLL 58 is synchronized with the write enable signal of the main signal on the working line side before time T31, and is in a free-run state from time T31 to time T32 in which the output frequency of the PLL 58 is changed from a frequency F1 to a frequency F3. The PLL 58 performs a synchronous pull-in operation to achieve synchronization with the write enable signal of the main signal on the protection line side from time T32, and the output frequency of the PLL 58 is changed from the frequency F3 to a frequency F2. The PLL 58 performs a synchronous pull-in operation to achieve synchronization with the write enable signal of the main signal on the working line side after time T33, and the output frequency of the PLL 58 is changed from the frequency F2 to the frequency F1. FIG. 17H illustrates the output frequency of the PLL 58 by using a solid line.

Thus, even when an immediate optical input disconnection occurs on the working line side, unnecessary switching from the working line side to the protection line side is not performed, and the synchronous pull-in time of the PLL 58 is reduced.

Third Case of Failure on Working Line Side and Subsequent Failure on Protection Line Side The case in which an optical input disconnection occurs in the network-side signal interface unit (Work) 70A and in which an optical input disconnection then occurs in the network-side signal interface unit (Protection) 70B will be described on the basis of the timing chart in FIGS. 18A to 18H.

As illustrated in FIG. 18A, in the network-side signal interface unit 70A on the working line side among the network-side signal interface units 70A and 70B, an optical input disconnection occurs at time T41, and recovery from the disconnection is made at time T41a. In the network-side signal interface unit 70B on the protection line side, an optical input disconnection occurs at time T42, and recovery from the disconnection is made at time T42a.

As illustrated in FIG. 18B, at time T43 when a time period for alarm detection has elapsed, the optical/electronic converter 91A detects an alarm, and recovery from the alarm is made at time T43a. At time T44, the optical/electronic converter 91B detects an alarm, and recovery from the alarm is made at time T44a.

As illustrated in FIG. 18C, using the above-described alarm detection as a trigger, the selector 97A is switched. The selector 97A outputs the main signal on the working line in the normal state before time T41, outputs an unstable signal from time T41 to time T43, and outputs an AIS having stuff information of the main signal on the protection line side for a time period from time T43 to the end of the time period for switch-back protection (from time T43a to time T45) even after the signal is returned back from the alarm signal to the normal signal. During this time period, since the protection line as well as the working line is in the alarm state, the stuff information of the main signal on the protection line side is actually not present. Then, the selector 97A outputs the main signal on the working line side.

As illustrated in FIG. 18D, the selector 97B is switched. The selector 97B outputs the main signal on the protection line in the normal state before time T42, outputs an unstable signal from time T42 to time T44, and outputs an AIS having stuff information of the main signal on the working line side for a time period from time T44 to the end of the time period for switch-back protection (from time T44a to time T46) even after the signal is returned back from the alarm signal to the normal signal. During this time period, since the working line as well as the protection line is in the alarm state, the stuff information of the main signal on the working line side is actually not present. Then, the selector 97B outputs the main signal on the protection line side.

After the switching of the selector 97A at time T43, the control-and-synchronization unit 80 starts a switching process. However, as illustrated in FIG. 18E, the selector 67 is not switched. The selector 67 outputs the main signal on the working line side before time T41, outputs an unstable signal from time T41 to time T43, outputs an AIS having stuff information of the main signal on the protection line side from time T43 to time T45, and outputs the main signal on the working line side after time T45.

As illustrated in FIG. 18F, the selector 61 is switched at times T43 and T45. The selector 61 outputs the main signal on the working line side before time T41, outputs an unstable signal from time T41 to time T43, outputs an AIS generated by the AIS generating circuit 63 from time T43 to time T45, and outputs the main signal on the working line side after time T45.

As illustrated in FIG. 18G, the PLL 58 is synchronized with the write enable signal of the main signal on the working line side before time T41, and is in a free-run state from time T41 to time T43. The PLL 58 performs a synchronous pull-in operation to achieve synchronization with the write enable signal of the main signal on the protection line side from time T43 to time T45. Since the stuff information of the main signal on the protection line side is actually not present, the PLL 58 is in a free-run state. Therefore, the output frequency of the PLL 58 is changed from a frequency F1 to a frequency F4. From time T45, the output frequency of the PLL 58 is changed from the frequency F4 to the frequency F1 in synchronization with the write enable signal of the main signal on the working line side. FIG. 18H illustrates the output frequency of the PLL 58 by using a solid line.

Fourth Case of Failure on Protection Line Side and Subsequent Failure on Working Line Side The case in which an optical input disconnection occurs in the network-side signal interface unit (Protection) 70B and in which an optical input disconnection then occurs in the network-side signal interface unit (Work) 70A will be described on the basis of the timing chart in FIGS. 19A to 19H.

As illustrated in FIG. 19A, in the network-side signal interface unit 70B on the protection line side among the network-side signal interface units 70A and 70B, an optical input disconnection occurs at time T51, and recovery from the disconnection is made at time T51a. In the network-side signal interface unit 70A on the working line side, an optical input disconnection occurs at time T52, and recovery from the disconnection is made at time T52a.

As illustrated in FIG. 19B, at time T53 when a time period for alarm detection has elapsed, the optical/electronic converter 91B detects an alarm, and recovery from the alarm is made at time T53a. At time T54, the optical/electronic converter 91A detects an alarm, and recovery from the alarm is made at time T54a.

As illustrated in FIG. 19C, using the above-described alarm detection as a trigger, the selector 97A is switched. The selector 97A outputs the main signal on the working line in the normal state before time T52, outputs an unstable signal from time T52 to time T54, and outputs an AIS having stuff information of the main signal on the protection line side for a time period from time T54 to the end of the time period for switch-back protection (from time T54a to time T56) even after the signal is returned back from the alarm signal to the normal signal. During this time period (from time T54 to time T56), since the protection line as well as the working line is in the alarm state, the stuff information of the main signal on the protection line side is actually not present. Then, the selector 97A outputs the main signal on the working line side.

As illustrated in FIG. 19D, the selector 97B is switched. The selector 97B outputs the main signal on the protection line in the normal state before time T51, outputs an unstable signal from time T51 to time T53, and outputs an AIS having stuff information of the main signal on the working line side for a time period from time T53 to the end of the time period for switch-back protection (from time T53a to time T55) even after the signal is returned back from the alarm signal to the normal signal. During this time period, since the working line as well as the protection line is in the alarm state, the stuff information of the main signal on the working line side is actually not present. Then, the selector 97B outputs the main signal on the protection line side.

After the switching of the selector 97A at time T54, the control-and-synchronization unit 80 starts a switching process. However, as illustrated in FIG. 19E, the selector 67 is not switched. The selector 67 outputs the main signal on the working line side before time T52, outputs an unstable signal from time T52 to time T54, outputs an AIS having stuff information of the main signal on the protection line side from time T54 to time T56, and outputs the main signal on the working line side after time T56.

As illustrated in FIG. 19F, the selector 61 is switched at times T54 and T56. The selector 61 outputs the main signal on the working line side before time T52, outputs an unstable signal from time T52 to time T54, outputs an AIS generated by the AIS generating circuit 63 from time T54 to time T56, and outputs the main signal on the working line side after time T56.

As illustrated in FIG. 19G, the PLL 58 is synchronized with the write enable signal of the main signal on the working line side before time T52, and is in a free-run state from time T52 to time T54. Therefore, the output frequency of the PLL 58 is changed from a frequency F1 to a frequency F3. The PLL 58 performs a synchronous pull-in operation to achieve synchronization with the write enable signal of the main signal on the protection line side from time T54 to time T56, and the output frequency of the PLL 58 is changed from the frequency F3 to a frequency F2. The output frequency of the PLL 58 is synchronized with the write enable signal of the main signal on the working line side after time T56, and is changed from the frequency F2 to the frequency F1. FIG. 19H illustrates the output frequency of the PLL 58 by using a solid line.

An exemplary switching control circuit includes the ODU-frame stuff terminating circuit 56, the selector 67, the control-and-synchronization unit 80, and the selectors 97A and 97B.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A transmission apparatus comprising:
    a network-side interface unit configured to receive a signal transmission frame into which a client signal is arranged from each of a working line and a protection line of a network, and extract the client signal from the received signal transmission frame;
    a client-side interface unit configured to transmit the extracted client signal to a client transmission path by using a clock generated by a phase synchronization circuit, based on frequency adjustment information of the client signal included in the signal transmission frame;
    a protection-line-side memory configured to store the frequency adjustment information of the client signal included in the signal transmission frame received from the protection line; and
    a switch controller configured to control the phase synchronization circuit so as to generate a clock by using the frequency adjustment information of the client signal stored in the protection-line-side memory when the signal transmission frame fails to be received from the working line.

2. The transmission apparatus according to claim 1,
    wherein the switch controller controls the phase synchronizing circuit so as to generate a clock based on the frequency adjustment information included in the signal transmission frame received from the protection line when the state in which the signal transmission frame fails to be received from the working line continues for a specific time period.

3. The transmission apparatus according to claim 2, further comprising:
    a working-line-side memory configured to store the frequency adjustment information of the client signal included in the signal transmission frame received from the working line,
    wherein the switch controller controls the phase synchronizing circuit so as to generate a clock based on the frequency adjustment information of the client signal stored in the working-line-side memory when the signal transmission frame fails to be received from the protection line.

4. The transmission apparatus according to claim 3,
    wherein the switch controller controls the phase synchronizing circuit so as to generate a clock based on the frequency adjustment information included in the signal transmission frame received from the working line when the state in which the signal transmission frame fails to be received from the protection line continues for a specific time period.

5. The transmission apparatus according to claim 4, wherein
    the network-side interface unit includes:
        a working-line-side arrangement circuit configured arranges, into an internal frame used inside the transmission apparatus, the signal transmission frame received from the working line with frequency adjustment information of the signal transmission frame in the working line;
        a working-line-side alarm arrangement circuit configured to arrange the signal transmission frame including an alarm signal into the internal frame;
    the transmission apparatus further comprising:
    a cross connector configured to cross-connect signals in the internal frame, wherein
    the client-side interface unit includes: an extraction circuit configured to extracts the signal transmission frame from the internal frame supplied from the cross connector,
    the protection-line-side memory stores the frequency adjustment information of the client signal included in the signal transmission frame received from the protection line and the frequency adjustment information of the signal transmission frame in the protection line, and
    when the signal transmission frame fails to be received from the working line, the switch controller controls the working-line-side alarm arrangement circuit to generate a signal transmission frame including the frequency adjustment information of the client signal stored in the protection-line-side memory, the alarm signal, and the frequency adjustment information of the signal transmission frame in the protection line stored in the protection-line-side memory so as to arrange the signal transmission frame into the internal frame, and controls the extraction unit to extract the signal transmission frame from the internal frame arranged by the working-lineside alarm arrangement circuit so as to generate a clock based on the client signal included in the extracted signal transmission frame.

6. The transmission apparatus according to claim 5, wherein
the network-side interface unit includes:
a protection-line-side arrangement circuit configured to arrange, into an internal frame used inside the transmission apparatus, the signal transmission frame received from the protection line with frequency adjustment information of the signal transmission frame in the protection line; and
a protection-line-side alarm arrangement circuit configured to arrange the signal transmission frame including an alarm signal into the internal frame,
wherein the working-line-side memory stores the frequency adjustment information of the client signal included in the signal transmission frame received from the working line and the frequency adjustment information of the signal transmission frame in the working line, and
wherein, when the signal transmission frame fails to be received from the protection line, the switch controller controls the protection-line-side alarm arrangement circuit to generate a signal transmission frame including the frequency adjustment information of the client signal stored in the working-line-side memory, the alarm signal, and the frequency adjustment information of the signal transmission frame in the working line stored in the working-line-side memory so as to arrange the signal transmission frame into the internal frame, and controls the extraction unit to extract the signal transmission frame from the internal frame arranged by the protection-line-side alarm arrangement circuit so as to generate a clock based on the client signal included in the extracted signal transmission frame.

7. A transmission method of a transmission apparatus configured to receive a signal transmission frame into which a client signal is arranged from a working line and a protection line of a network, extract the client signal from the received signal transmission frame, and transmit the extracted client signal to a client transmission path by using a clock generated by a phase synchronizing circuit, based on frequency adjustment information of the client signal included in the signal transmission frame, the transmission method comprising:
storing the frequency adjustment information of the client signal included in the signal transmission frame received from the protection line into a protection-line-side memory; and
controlling the phase synchronizing circuit to generate a clock by using the frequency adjustment information of the client signal stored in the protection-line-side memory when the signal transmission frame fails to be received from the working line.

8. The transmission method according to claim 7, further comprising:
controlling the phase synchronizing circuit to generate a clock based on the frequency adjustment information included in the signal transmission frame received from the protection line when the state in which the signal transmission frame fails to be received from the working line continues for a specific time period.

9. The transmission method according to claim 8, further comprising:
storing the frequency adjustment information of the client signal included in the signal transmission frame received from the working line in a working-line-side memory,
wherein the phase synchronizing circuit is controlled to generate a clock by using the frequency adjustment information of the client signal stored in the working-line-side memory when the signal transmission frame fails to be received from the protection line.

10. The transmission method according to claim 9,
wherein the phase synchronizing circuit is controlled to generate a clock based on the frequency adjustment information included in the signal transmission frame received from the working line when the state in which the signal transmission frame fails to be received from the protection line continues for a specific time period.

11. The transmission method according to claim 10, further comprising:
arranging, into an internal frame used inside the transmission apparatus, the signal transmission frame received from the working line with frequency adjustment information of the signal transmission frame in the working line;
arranging a signal transmission frame including an alarm signal into the internal frame;
cross-connecting signals in the internal frame; and
extracting the signal transmission frame from the internal frame supplied from the cross-connecting,
wherein the protection-line-side memory stores the frequency adjustment information of the client signal included in the signal transmission frame received from the protection line and the frequency adjustment information of the signal transmission frame in the protection line, and
wherein, when the signal transmission frame fails to be received from the working line, a signal transmission frame including the frequency adjustment information of the client signal stored in the protection-line-side memory, the alarm signal, and the frequency adjustment information of the signal transmission frame in the protection line stored in the protection-line-side memory is generated so as to arrange the signal transmission frame into the internal frame, and the signal transmission frame is extracted from the arranged internal frame so as to generate a clock by using the frequency adjustment information of the client signal included in the extracted signal transmission frame.

12. The transmission method according to claim 11, further comprising:
arranging, into an internal frame used inside the transmission apparatus, the signal transmission frame received from the protection line with frequency adjustment information of the signal transmission frame in the protection line; and
arranging a signal transmission frame including an alarm signal into the internal frame,
wherein the working-line-side memory stores the frequency adjustment information of the client signal included in the signal transmission frame received from the working line and the frequency adjustment information of the signal transmission frame in the working line, and
wherein, when the signal transmission frame fails to be received from the protection line, a signal transmission frame including the frequency adjustment information of the client signal stored in the working-line-side memory, the alarm signal, and the frequency adjustment information of the signal transmission frame in the working line stored in the working-line-side memory is generated so as to arrange the signal transmission frame into the internal frame, and the signal transmission frame is extracted from the arranged internal frame so as to generate a clock by using the frequency adjustment information of the client signal included in the extracted signal transmission frame.

* * * * *